United States Patent
Lee et al.

(10) Patent No.: US 11,321,438 B2
(45) Date of Patent: May 3, 2022

(54) ELECTRONIC DEVICE FOR ACQUIRING BIOMETRIC INFORMATION BY USING ELECTRODE SELECTED FROM ELECTRODES OF BIOMETRIC SENSOR, AND METHOD FOR CONTROLLING SAME

(71) Applicant: Samsung Electronics Co., Ltd., Gyeonggi-do (KR)

(72) Inventors: Minwoo Lee, Gyeonggi-do (KR); Taesung Kim, Gyeonggi-do (KR); Wonhee Choe, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/971,771

(22) PCT Filed: Feb. 14, 2019

(86) PCT No.: PCT/KR2019/001828
§ 371 (c)(1),
(2) Date: Aug. 21, 2020

(87) PCT Pub. No.: WO2019/164183
PCT Pub. Date: Aug. 29, 2019

(65) Prior Publication Data
US 2021/0089636 A1    Mar. 25, 2021

(30) Foreign Application Priority Data
Feb. 21, 2018  (KR) ........................ 10-2018-0020811

(51) Int. Cl.
*G06F 21/32*     (2013.01)
*G06K 9/00*      (2006.01)

(52) U.S. Cl.
CPC ........... *G06F 21/32* (2013.01); *G06K 9/0002* (2013.01)

(58) Field of Classification Search
CPC ...... G06F 21/32; G06K 9/0002; H04M 1/725; H04M 1/72454; H04M 2250/12; H04M 2201/34; H04M 2201/38
See application file for complete search history.

(56) References Cited

U.S. PATENT DOCUMENTS

| | | | |
|---|---|---|---|
| 2013/0057480 A1 | 3/2013 | Brunet et al. | |
| 2016/0098140 A1 | 4/2016 | Lee et al. | |

(Continued)

FOREIGN PATENT DOCUMENTS

| | | | |
|---|---|---|---|
| KR | 10-2016-0057324 A | 5/2016 | |
| KR | 10-2016-0141180 A | 12/2016 | |

(Continued)

*Primary Examiner* — Edward F Urban
*Assistant Examiner* — Wassim Mahrouka
(74) *Attorney, Agent, or Firm* — Cha & Reiter, LLC

(57) ABSTRACT

Provided are an electronic device for acquiring biometric information by using an electrode selected from electrodes of a biometric sensor, and a method for controlling same. An electronic device according to various embodiments of the present document may comprise: a biometric sensor including a plurality of electrodes for acquiring biometric information; and a processor electrically connected to the biometric sensor, wherein the processor is configured to determine whether an event related to acquiring of the biometric information occurs, select certain electrodes from the plurality of electrodes to acquire the biometric information, in response to occurrence of the event, and acquire the biometric information by using the selected electrodes.

13 Claims, 27 Drawing Sheets

(56) References Cited

U.S. PATENT DOCUMENTS

| | | | |
|---|---|---|---|
| 2016/0148034 A1* | 5/2016 | Kremin | G06K 9/00033 |
| | | | 382/124 |
| 2016/0350571 A1 | 12/2016 | Han et al. | |
| 2017/0024602 A1* | 1/2017 | Han | G06F 3/0445 |
| 2017/0351364 A1 | 12/2017 | Kim et al. | |
| 2018/0113548 A1* | 4/2018 | Lee | G06F 3/04166 |
| 2019/0147211 A1* | 5/2019 | Shu | G06K 9/0002 |
| | | | 382/124 |
| 2019/0227652 A1 | 7/2019 | Kwon | |

FOREIGN PATENT DOCUMENTS

| KR | 10-2017-0010935 A | | 2/2017 |
|---|---|---|---|
| KR | 10-2017-0030735 A | | 3/2017 |
| KR | 10-1770521 B1 | | 9/2017 |
| KR | 20180000974 A | * | 1/2018 |

* cited by examiner

ELECTRONIC DEVICE FOR ACQUIRING BIOMETRIC INFORMATION BY USING ELECTRODE SELECTED FROM ELECTRODES OF BIOMETRIC SENSOR, AND METHOD FOR CONTROLLING SAME

CROSS-REFERENCE TO RELATED APPLICATION(S)

This application is a National Phase Entry of PCT International Application No. PCT/KR2019/001828, which was filed on Feb. 14, 2019, and claims priority to Korean Patent Application No. 10-2018-0020811, which was filed on Feb. 21, 2018, the contents of which are incorporated herein by reference.

BACKGROUND

1. Field

The disclosure relates to an electronic device and control method for sensing fingerprints using an electrode selected from among electrodes of a biometric sensor.

2. Description of the Related Art

With computer technology advancing, there are being developed computer-based systems with various purposes, such as laptop computers, tablet PCs, smartphones, personal digital assistants (PDAs), or search guidance systems. Since these systems usually store personal information related to personal privacy, as well as a lot of data that requires confidentiality such as business information or business confidentiality, there is a need to increase security to protect this data. Accordingly, a biometric sensor (e.g., fingerprint sensor) capable of enhancing security by registering or authenticating a system using a user's biometric information (e.g., a fingerprint image) is known.

Recently, with the rapid spread of portable electronic devices such as smart phones, types of portable electronic devices equipped with a biological sensor are increasing as a method for enhancing security in portable electronic devices. Thus enhanced security schemes are provided to users as compared with conventional ones, such as of using password entry.

SUMMARY

Biometric sensors (e.g., fingerprint sensors) may include various types of fingerprint sensors, such as optical fingerprint sensors, capacitive fingerprint sensors, and ultrasound fingerprint sensors. Further, touch sensor-integrated fingerprint sensors (which are referred to herein as "integrated finger sensors") are provided to users via smartphones or other portable electronic devices. An integrated fingerprint sensor may be combined or connected with the display device (e.g., display) of a smartphone to obtain fingerprint images (or sense fingerprints) using the entire area of the display device.

A capacitive integrated fingerprint sensor may include a plurality of electrodes to obtain data for the user's fingerprint image. The plurality of electrodes may include, e.g., Tx electrodes (or transmission electrodes) connected with a Tx driving circuit and Rx electrodes (or reception electrodes) connected with an Rx driving circuit. The Tx driving circuit and the Rx driving circuit may be implemented (or manufactured) to be integrated in a single read-out integrated circuit (IC), which is referred to herein as a "read-out circuit").

When a fingerprint image is obtained via a capacitive integrated fingerprint sensor, if a fingerprint is sensed from an area with good sensitivity (or with a high signal-to-noise ratio (SNR)) among the areas where fingerprints are sensible by the integrated fingerprint sensor, the fingerprint image obtained as a fingerprint is sensed may have the characteristic of being robust against noise (or having high noise immunity). When a fingerprint image is obtained by a capacitive integrated fingerprint sensor, if the fingerprint is sensed from a high dynamic range sensing area among sensing areas where fingerprints are sensible by the integrated fingerprint sensor, a clear fingerprint image (or a fingerprint image with a high power of expression) may be obtained. When a fingerprint image is obtained by an integrated fingerprint sensor, if fingerprints are sensed only from some sensing areas among sensing areas where fingerprints are sensible by the integrated fingerprint sensor, scanning may be performed only on some areas (or some electrodes), not all of the areas (or all of the electrodes) of the integrated fingerprint sensor, so that the report rate may be elevated. In the case of a capacitive integrated fingerprint sensor, in general, a position closer to the lead-out circuit may have a high (or increased) signal-to-noise ratio, high dynamic range, and high report rate characteristics.

According to various embodiments, there is provided a fingerprint sensor capable of increasing the fingerprint recognition success rate by obtaining a fingerprint image in a position close to the read-out circuit and thus clear fingerprint image data.

According to various embodiments, there is provided a fingerprint sensor capable of quickly reading out fingerprint data according to a high read-out speed by obtaining a fingerprint image in a position close to the read-out circuit.

According to various embodiments, there is provided a fingerprint sensor capable of increasing the fingerprint recognition success rate by obtaining clear fingerprint image data by sensing a fingerprint from an area, which has low-noise characteristics and/or high dynamic range characteristics, among the areas where a fingerprint is sensible by a fingerprint sensor even in a position which is not close to the read-out circuit.

According to various embodiments, there is provided an electronic device which is implemented to include a fingerprint sensor to provide an increased fingerprint recognition success rate and high fingerprint sensing speed.

According to various embodiments, an electronic device may comprise a biometric sensor (e.g., a fingerprint sensor) including a plurality of electrodes for obtaining biometric information (e.g., a fingerprint image) and a processor electrically connected with the biometric sensor. The processor may be configured to identify an occurrence of an event related to obtaining the biometric information, select some electrodes for obtaining the biometric information from among the plurality of electrodes according to the occurrence of the event, and obtain the biometric information using the selected some electrodes.

According to various embodiments, a method for controlling an electronic device including a biometric sensor may comprise identifying, by the electronic device, an occurrence of an event related to obtaining the biometric information, selecting, by the electronic device, some electrodes for obtaining the biometric information from among a plurality of electrodes of the biometric sensor according to the occurrence of the event, and obtaining the biometric information using the selected some electrodes by the electronic device.

According to various embodiments, a biometric sensor may comprise a touch panel with a plurality of electrodes and a read-out circuit connected with the plurality of electrodes. The read-out circuit may be configured to select some electrodes for obtaining biometric information from among the plurality of electrodes according to a control signal transmitted from a processor, outputting a driving signal for obtaining the biometric information only for the some selected electrodes, obtaining data for a variation in capacitance corresponding to the output of the driving signal, and transmitting the obtained data to the processor.

According to various embodiments, biometric information (e.g., a fingerprint image) may be obtained in a position close to a read-out circuit, so that a biometric sensor (e.g., a fingerprint sensor) with an increased biometric information recognition rate may be provided.

According to various embodiments, biometric information (e.g., a fingerprint image) may be obtained in a position close to a read-out circuit, so that a biometric sensor (e.g., a fingerprint sensor) may be provided which may quickly read out data related to biometric information according to a high read-out speed.

According to various embodiments, biometric information may be obtained from an area with low noise characteristics and/or high dynamic range characteristics among areas where biometric information may be obtained (e.g., a fingerprint is sensible) by a biometric sensor (e.g., a fingerprint sensor) even in a position which is not close to the read-out circuit, so that a biometric sensor with an increased biometric information recognition rate may be provided.

According to various embodiments, there may be provided an electronic device with a biometric sensor which has an increased biometric information recognition rate and high biometric information processing speed (e.g., fingerprint sensing speed).

The effects set forth herein are not limited thereto, and it is apparent to one of ordinary skill in the art that various effects may be disclosed herein.

DETAILED DESCRIPTION

The terms coming with ordinal numbers such as 'first' and 'second' may be used to denote various components, but the components are not limited by the terms. The terms are used to distinguish one component from another. For example, a first component may be denoted a second component, and vice versa without departing from the scope of the present disclosure. The term "and/or" may denote a combination(s) of a plurality of related items as listed or any of the items.

Figure 1:
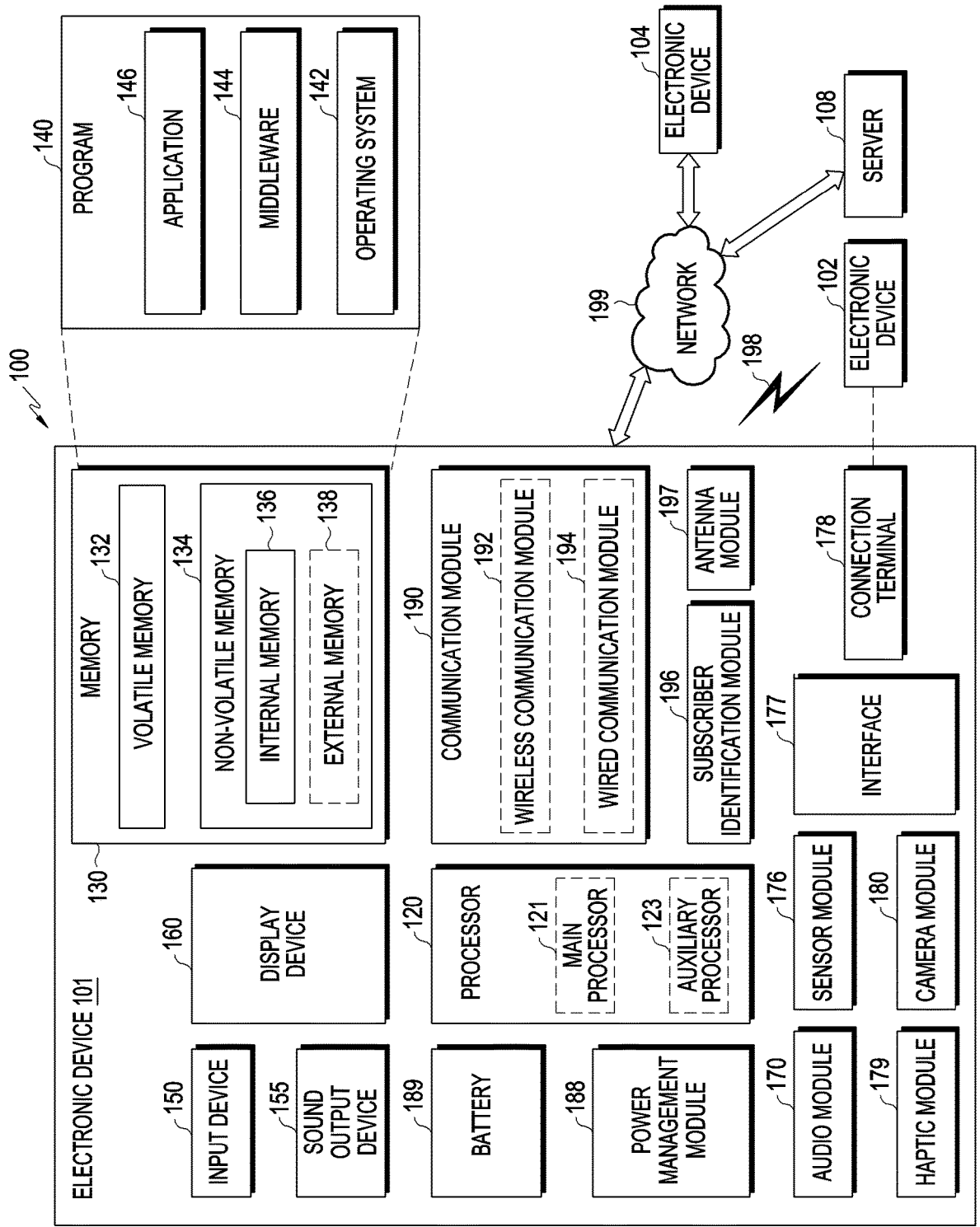
FIG. 1 is a block diagram illustrating an electronic device in a network environment for obtaining biometric information using an electrode selected from among electrodes of a biometric sensor, according to various embodiments.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a pen input device (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module 197 may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
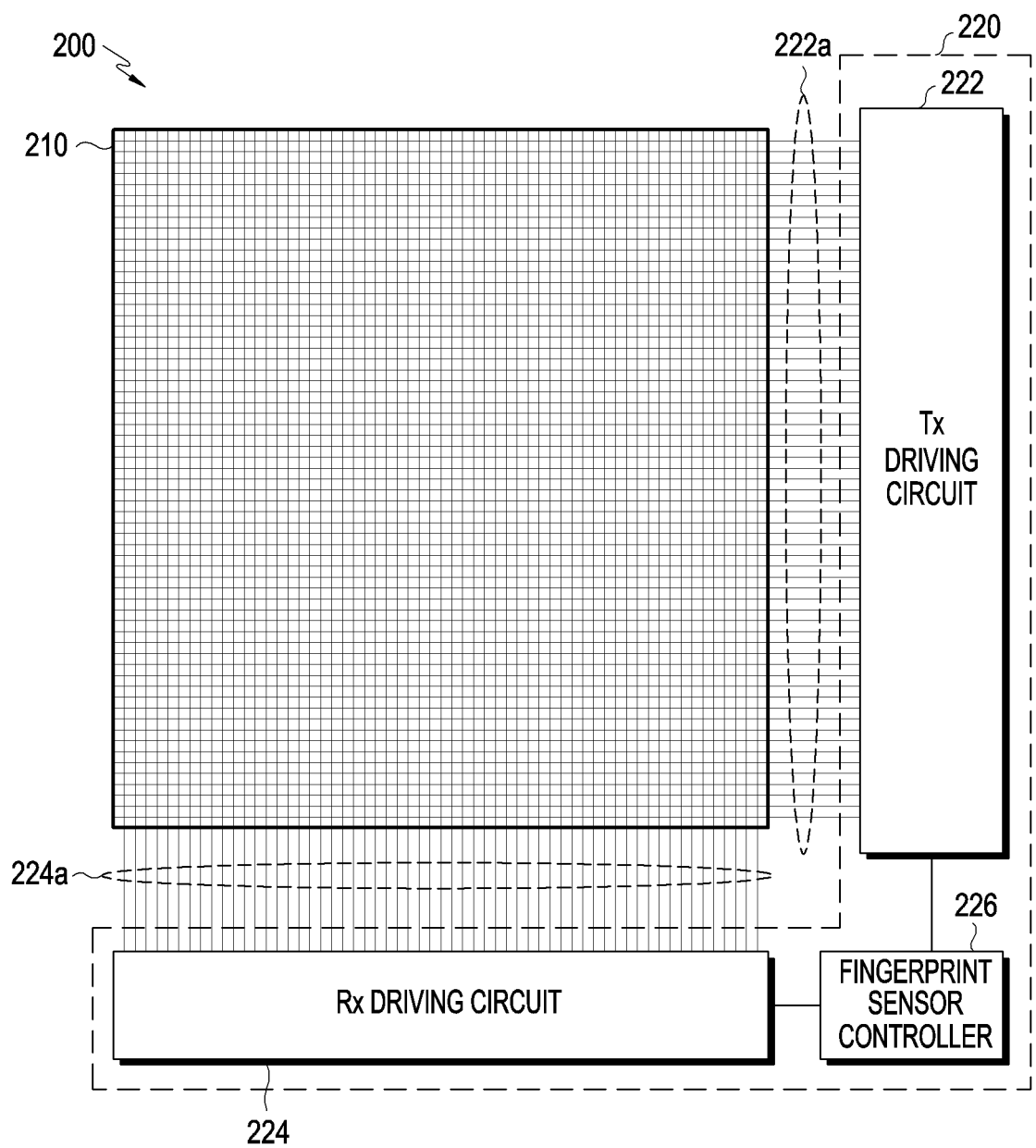
FIGS. 2A, 2B and 2C are views illustrating a fingerprint sensor according to various embodiments.
Figure 2B:
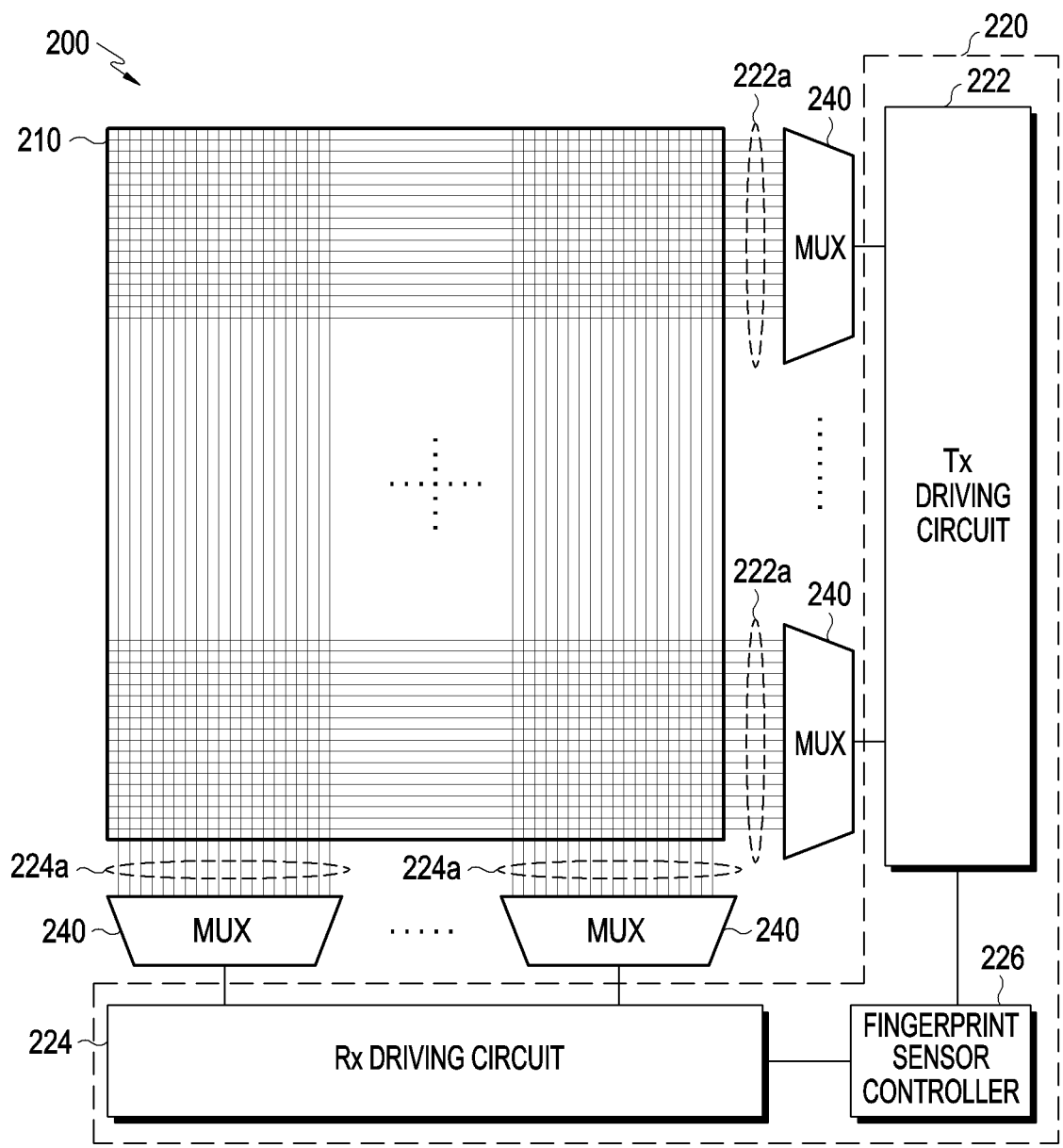
Figure 2C:
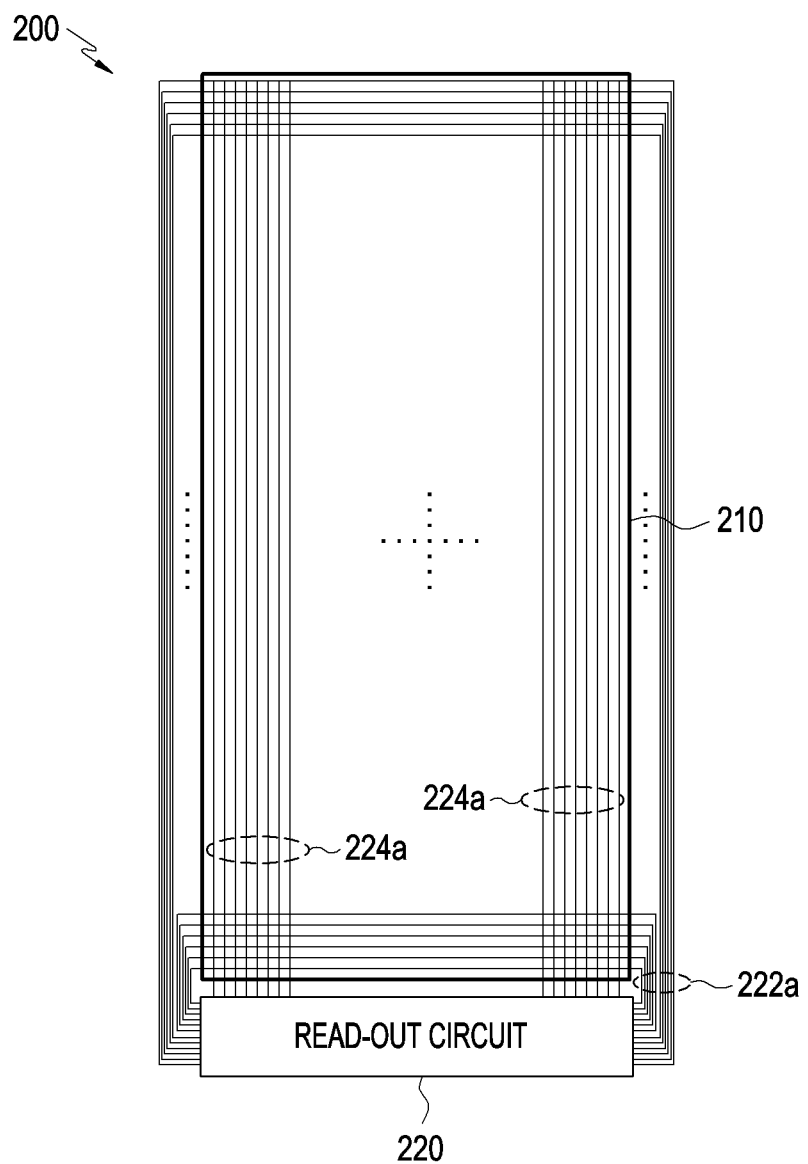

FIGS. 2A, 2B and 2C are views illustrating a biometric sensor (e.g., a fingerprint sensor) according to various embodiments. Hereinafter, various embodiments are described based on a fingerprint sensor as an example biometric sensor for ease of description. However, various embodiments described below may also be applied to other sensors than the fingerprint sensor.

Referring to FIG. 2A, according to various embodiments, a fingerprint sensor 200 may include a touch panel 210, a Tx driving circuit 222, an Rx driving circuit 224, and a fingerprint sensor controller 226. According to various embodiments, the Tx driving circuit 222, the Rx driving circuit 224, and the fingerprint sensor controller 226 may be implemented to be integrated into a single read-out circuit (ROIC) 220. According to various embodiments, the fingerprint sensor 200 may sense the user's touch input (or compute the coordinates of the user's touch input) and sense the user's fingerprint. According to various embodiments, the case where the fingerprint sensor 200 is configured to sense the user's touch input may be referred to herein as a "touch sensing mode" for ease of description. Further, according to various embodiments, the case where the fingerprint sensor 200 is configured to sense the user's fingerprint may be referred to herein as a "fingerprint sensing mode" for ease of description. In a case where the fingerprint sensor 200 is implemented as a component included in an electronic device (e.g., the electronic device 101 of FIG. 1), at least some of various operations performed by the fingerprint sensor 200, according to various embodiments, may be controlled by the electronic device (e.g., the processor 120 of FIG. 1). According to various embodiments, the fingerprint sensor 200 may include functions of a touch sensor, i.e., the function of sensing the user's touch (e.g., identifying the coordinates of the touch). For example, the fingerprint sensor 200 and the touch sensor may be integrated (e.g., manufactured as a single sensor). According to various embodiments, the fingerprint sensor 200 may be implemented separately from the touch sensor (e.g., the fingerprint sensor 200 may perform only functions for fingerprint sensing). According to various embodiments, in a case where the fingerprint sensor 200 and the touch sensor are implemented to be integrated, the fingerprint sensor controller 226 may be integrated into a single controller that controls both the function of fingerprint sensing by the fingerprint sensor 200 and the function of touch sensing. According to various embodiments, in a case where the fingerprint sensor 200 is implemented separately from the touch sensor, the fingerprint sensor controller 226 may be implemented to control only functions for fingerprint sensing by the fingerprint sensor 200. In this case, a separate controller for controlling the touch sensing function by the touch sensor may be included in the electronic device (e.g., the electronic device 101 of FIG. 1).

According to various embodiments, in a case where the fingerprint sensor 200 and the touch sensor are implemented to be integrated together, it may be configured that fingerprints may be sensed only from some areas of the fingerprint sensor 200. In this case, according to various embodiments, the interval between the electrodes (e.g., Tx electrodes 222a and Rx electrodes 224a) in the area where fingerprint sensing is performed in the fingerprint sensor 200 may be smaller (e.g., more closely) than the interval between the electrodes (e.g., Tx electrodes 222a and Rx electrodes 224a) in another area (e.g., an area where touch sensing is performed).

According to various embodiments, Tx electrodes (or channels) 222a and Rx electrodes 224a may be disposed on the touch panel 210. According to various embodiments, a dielectric may be disposed (or inserted) between the Tx electrodes 222a and the Rx electrodes 224a. Thus, according to various embodiments, the Tx electrodes 222a and the Rx electrodes 224a may substantially not contact (or cross) each other. However, in the course of describing various embodiments of the disclosure, the Tx electrodes 222a and the Rx electrodes 224a may be mentioned as being crossed (or crossing each other). This may be an expression mentioned in the course of describing various embodiments on a two-dimensional plane for ease of description, as shown in FIG. 2A. According to various embodiments, the touch panel 210 may include a plurality of touch sensors formed at the crossings of the Tx electrodes 222a and the Rx electrodes 224a, with the dielectric interposed therebetween. According to various embodiments, to obtain a fingerprint image, the interval between the Tx electrodes 222a and the interval between the Rx electrodes 224a may range from, e.g., 40 µm to 100 µm. However, this is merely an example, and for the interval, other various ranges than the range from 40 µm to 100 µm may be possible. According to various embodiments, each touch sensor (or fingerprint sensor 200) may be implemented in a mutual capacitance type or in a self-capacitance type. In the disclosure, for ease of description, the fingerprint sensor 200 is described as using the mutual capacitance type. According to various embodiments of the disclosure, the fingerprint sensor 200 may include a fingerprint sensor using an optical type or ultrasound type other than the capacitance type.

According to various embodiments, the Tx driving circuit 222 may select at least one Tx electrode to which a driving signal (or driving pulse) is to be output from among the Tx electrodes 222a and transmit (or provide) a driving signal to the at least one selected Tx electrode. According to various embodiments, at least one operation performed by the Tx driving circuit 222 may be controlled by the fingerprint sensor controller 226. According to various embodiments, in a case where the fingerprint sensor 200 is included in the electronic device (e.g., the electronic device 101 of FIG. 1) and is implemented as a component of the electronic device 101, at least one operation performed by the Tx driving circuit 222 may be controlled by the electronic device (e.g., the processor 120 of FIG. 1). For example, according to various embodiments, the electronic device (e.g., the processor 120 of FIG. 1) may output (or transmit) a control signal to the fingerprint sensor controller 226, and the fingerprint sensor controller 226 may control the Tx driving circuit 222 and/or the Rx driving circuit 224 according to the received control signal. In a case where the fingerprint sensor 200, according to various embodiments, is included in the electronic device (e.g., the electronic device 101 of FIG. 1) and is implemented as a component of the electronic device 101, the electronic device (e.g., the processor 120 of FIG. 1) may control the Tx driving circuit 222 and/or the Rx driving circuit 224 directly (i.e., not via the fingerprint sensor controller 226). According to various embodiments, the driving signal may function as a signal for detecting touch coordinates if the fingerprint sensor 200 is operated in touch sensing mode and, as a signal for obtaining the user's fingerprint image if the fingerprint sensor 200 is operated in fingerprint sensing mode. According to various embodiments, the touch sensing mode and fingerprint sensing mode may be performed (e.g., executed) simultaneously or at different times.

According to various embodiments, the Rx driving circuit 224 may select an Rx electrode corresponding to at least one touch sensor, from which information about a variation in capacitance is to be obtained (or read-out), from among a plurality of touch sensors, and obtain information (or data) about a variation in the capacitance of the touch sensor via the at least one selected Rx electrode. According to various embodiments, the Rx driving circuit 224 may sample the information about the variations in capacitance of the touch sensors obtained via the Rx electrodes 224a and convert into digital data, i.e., touch raw data. According to various embodiments, the Rx driving circuit 224 may transmit the touch raw data to a control module (e.g., the processor 120 of FIG. 1 or a micro-controller unit (MCU) (not shown)). According to various embodiments, the control module may be connected to be able to operate with at least one of the Rx driving circuit 224 and the fingerprint sensor controller 226. According to various embodiments, the control module may receive the touch raw data from the read-out circuit 220. According to various embodiments, the control module may compute touch coordinates using various methods for obtaining touch coordinates based on the touch raw data. According to various embodiments, in a case where the control module is implemented as an MCU, the MCU may transmit information about the computed touch coordinates to the processor (e.g., the processor 120 of FIG. 1). According to various embodiments, for the control module, various elements capable of controlling fingerprint sensing or computing touch coordinates may be used interchangeably/ alternatively to the processor (e.g., the processor 120 of FIG.

1 and/or an MCU (not shown)). According to various embodiments, the operation of sensing a fingerprint (e.g., obtaining a fingerprint image) using the fingerprint sensor 200 is described below with reference to FIG. 3B.

According to various embodiments, at least one operation performed by the Rx driving circuit 224 may be controlled by the fingerprint sensor controller 226. According to various embodiments, in a case where the fingerprint sensor 200 is included in the electronic device (e.g., the electronic device 101 of FIG. 1) and is implemented as a component of the electronic device, at least one operation performed by the Rx driving circuit 224 may be controlled by the electronic device (e.g., the processor 120 of FIG. 1). The description of the Tx driving circuit 222 may apply likewise to this.

According to various embodiments, the fingerprint sensor controller 226 may generate a Tx configuration signal to configure at least one Tx electrode, to which a driving signal from the Tx driving circuit 222 is to be transmitted, and an Rx configuration signal to configure at least one Rx electrode for obtaining information about a variation in capacitance from the Rx driving circuit 224. According to various embodiments, the fingerprint sensor controller 226 may transmit the generated configuration signals to the Tx driving circuit 222 and/or the Rx driving circuit 224, respectively. According to various embodiments, the fingerprint sensor controller 226 may generate timing control signals to control the operation timing of the Tx driving circuit 222 and the Rx driving circuit 224 and transmit the generated timing control signals to the Tx driving circuit 222 and/or the Rx driving circuit 224, respectively. According to various embodiments, the operation in which the fingerprint sensor controller 226 generates a set-up signal or timing control signal and transmits it to each driving signal may be controlled by the electronic device (e.g., the processor 120 of FIG. 1) if the fingerprint sensor 200 is included in the electronic device (e.g., the electronic device 101 of FIG. 1) and is implemented as a component of the electronic device. For example, the electronic device (e.g., the processor 120 of FIG. 1) may transmit a control signal including an instruction, which enables the fingerprint sensor controller 226 to generate a setup signal or timing control signal, to the fingerprint sensor controller 226. Or, the electronic device (e.g., the processor 120 of FIG. 1) may generate a setup signal or timing control signal and may directly transmit generated signals to the Tx driving circuit 222 and/or Rx driving circuit 224.

Referring to FIG. 2B, according to various embodiments, at least one electrode of the Tx electrodes 222a and the Rx electrodes 224a of the fingerprint sensor 200 may be connected with each driving circuit via a multiplexer (MUX) 240. According to various embodiments, the number of electrodes connected with one multiplexer 240 may be 20, but this is merely an example.

FIG. 2C briefly illustrates a connection between the fingerprint sensor 200 and the read-out circuit 220 according to various embodiments shown in FIG. 2A. Referring to FIG. 2C, according to various embodiments, the Tx electrodes 222a and the Rx electrodes 224a may be connected to the read-out circuit 220 and be included in the electronic device (e.g., the electronic device 101 of FIG. 1).

Figure 2D:
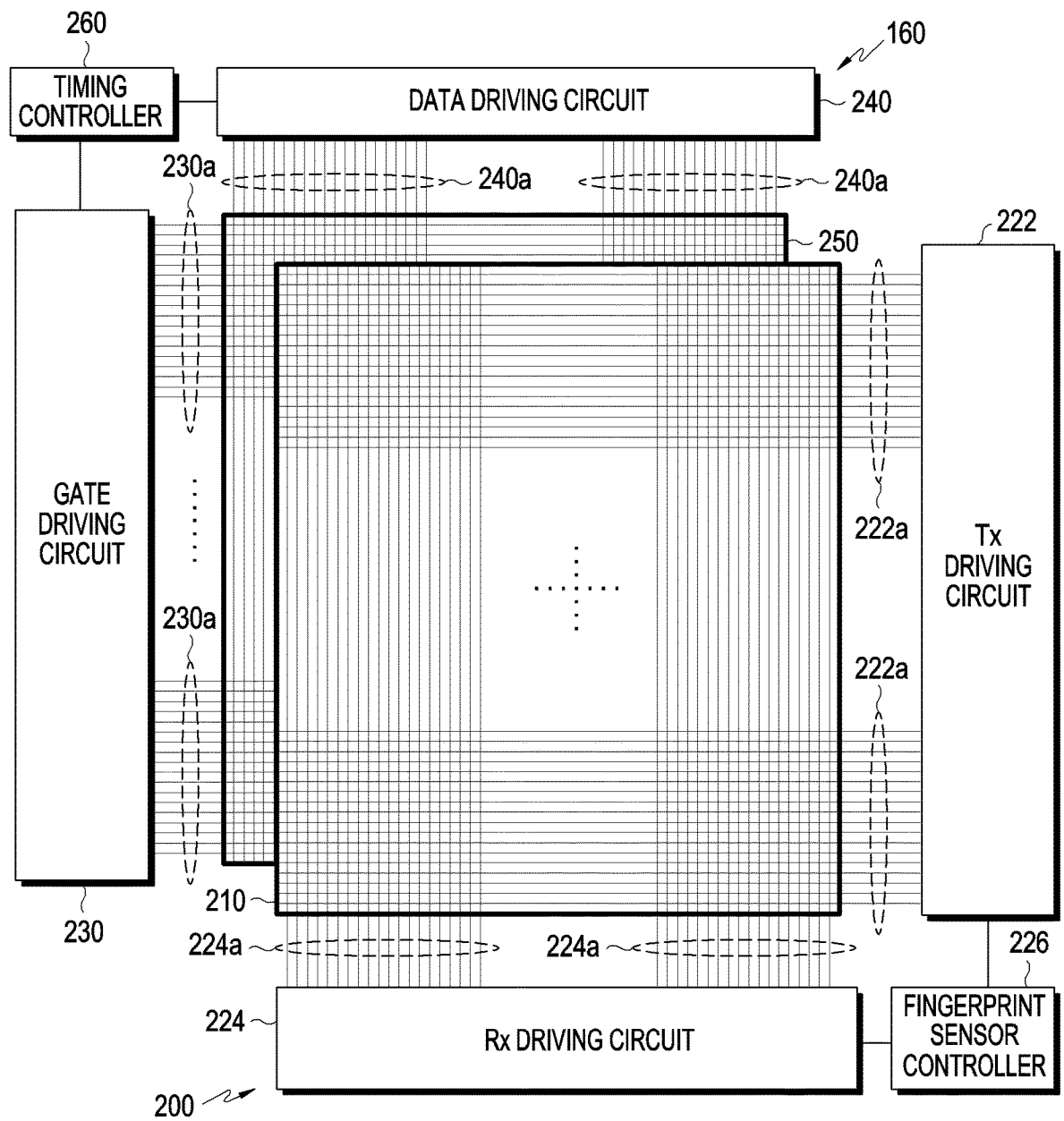
FIG. 2D is a view illustrating an implementation example in which a fingerprint sensor is combined (or connected) with a display device according to various embodiments.

FIG. 2D is an example view for describing an embodiment in which the fingerprint sensor 200 is implemented to be combined (or connected) with the display device 160 (e.g., a display) according to various embodiments. According to various embodiments, the fingerprint sensor 200 may be connected with the display device 160 and be included in the electronic device (e.g., the electronic device 101 of FIG. 1).

According to various embodiments, the display device 160 may include a gate driving circuit 230, a data driving circuit 240, a display panel 250, and a timing controller 260.

According to various embodiments, the gate driving circuit 230 may sequentially supply gate signals (or scan signals) synchronized with a data voltage to the gate electrodes 230a, selecting the pixels of the display panel 250 to which data voltages are to be supplied.

According to various embodiments, the data driving circuit 240 may receive digital image data RGB and a source timing control signal from the timing controller 260. According to various embodiments, the data driving circuit 240 may convert digital image data into analog data voltages according to the source timing control signal and supply the analog data voltages to the data electrodes 240a.

According to various embodiments, the timing controller 260 may receive digital image data and timing signals from the processor 120 of the electronic device (e.g., the electronic device 101 of FIG. 1). According to various embodiments, the timing signals may include, e.g., a vertical synchronization signal, a horizontal synchronization signal, a data enable signal, and a dot clock. According to various embodiments, the timing controller 260 may generate a source timing control signal for controlling the operation timing of the data driving circuit 240 and a gate timing control signal for controlling the operation timing of the gate driving circuit 230, based on timing signals so as to control the operation timings of the gate driving circuit 230 and the data driving circuit 240. According to various embodiments, the timing controller 260 may transmit the gate timing control signal to the gate driving circuit 230 and the digital image data and source timing control signal to the data driving circuit 240. According to various embodiments of the disclosure, at least some operations performed by the timing controller 260 may be performed by the processor 120 as well.

According to various embodiments, the display panel 250 may be implemented as a flat display device, such as a liquid crystal display (LCD), field emission display (FED), plasma display panel (PDP), organic light emitting display (OLED), or electrophoresis (EPD).

According to various embodiments, in a case where the fingerprint sensor 200 is combined with the display device 160, the touch panel 210 may be attached onto the top of the display panel 250. According to various embodiments, in a case where the display panel 250 is implemented as a liquid display device, the touch panel 210 may be attached onto an upper polarizer of the display panel 250 or between the upper polarizer and the display panel 250. According to various embodiments, the touch panel 210 may be implemented to be included (e.g., integrated) in the display panel 250. According to various embodiments, the size of the touch panel 210 may be identical to or different from the size of the display panel 250.

Figure 3A:
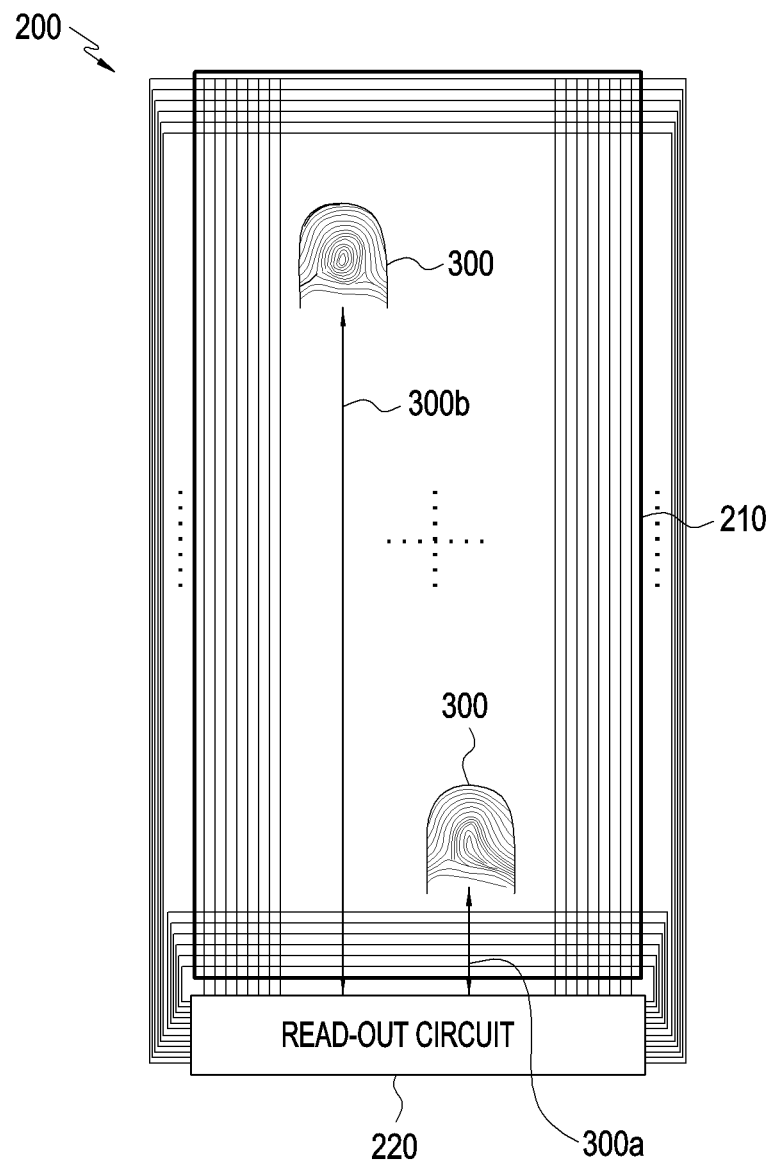
FIG. 3A is a view illustrating an example of comparison between when a fingerprint is sensed in a position close to a read-out circuit and when a fingerprint is sensed in a position far away from the read-out circuit according to various embodiments.

FIG. 3A is a view illustrating an example of comparison between when a fingerprint 300 is sensed in a position close to a read-out circuit 220 and when a fingerprint 300 is sensed in a position far away from the read-out circuit 220 according to various embodiments.

According to various embodiments, the user's fingerprint 300 may be sensed in a position close (e.g., distance 300a away) to the read-out circuit 220, or the user's fingerprint 300 may be sensed in a position (e.g., distance 300b) away from the read-out circuit 220. According to various embodiments, in a case where the fingerprint is sensed in a position close to the read-out circuit 220, the fingerprint recognition success rate and processing speed for fingerprint data may increase as compared with when the fingerprint is sensed in a position far away from the read-out circuit 220.

Figure 3B:
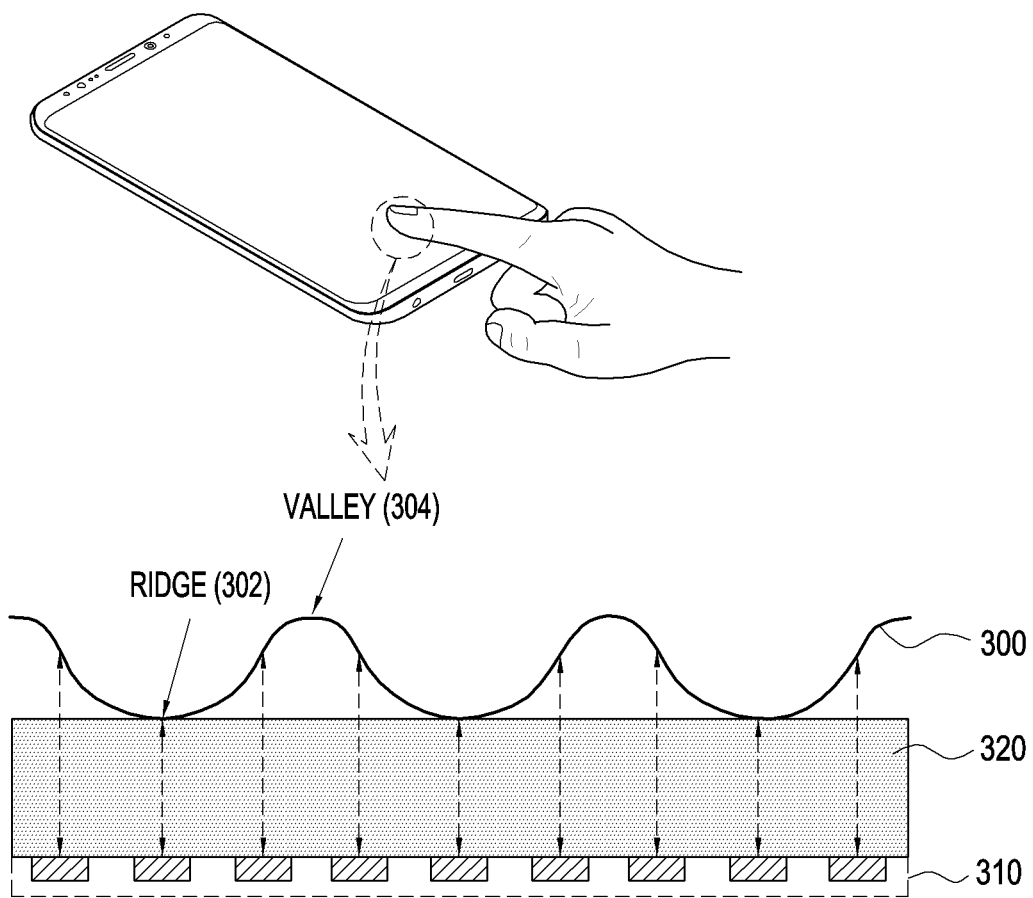
FIGS. 3B and 3C are views illustrating an example operation for obtaining a fingerprint image using a capacitive scheme according to various embodiments.
Figure 3C:
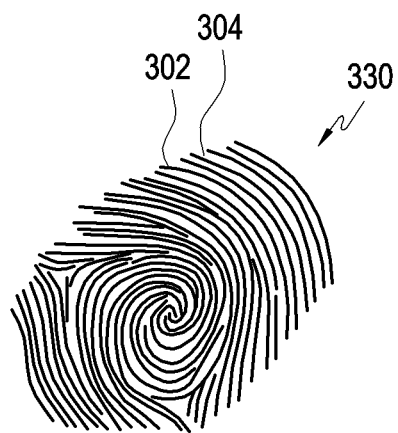

FIGS. 3B and 3C are views illustrating an example operation (or function) for obtaining a fingerprint image using a capacitive scheme according to various embodiments.

Referring to FIG. 3B, according to various embodiments, in a case where the fingerprint sensor (e.g., the fingerprint sensor 200 of FIG. 2A) is included in the electronic device (e.g., the electronic device 101 of FIG. 1) and is implemented as a component of the electronic device, the electronic device (e.g., the processor 120 of FIG. 1) may detect a variation in capacitance due to a contact of a ridge 302 of the fingerprint 300 to the protection layer 320 (or fingerprint sensing electrode 310 (e.g., the Tx electrodes 222a and the Rx electrodes 224a)). According to various embodiments, the fingerprint sensor 200 may generate (e.g., obtain) an image including the shape of the fingerprint 400 based on the variation in capacitance. Referring to FIG. 3C, as the fingerprint 300 contacts as shown in FIG. 3B, a fingerprint image 330 including the ridge 302 and the valley 304 may be obtained.

Figure 4A:
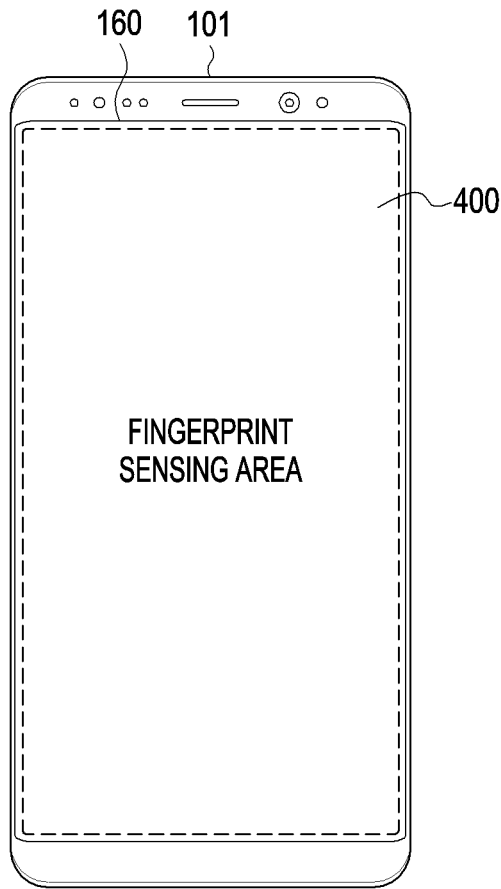
FIGS. 4A and 4B are views illustrating an example full sensing mode and an example partial sensing mode according to various embodiments.
Figure 4B:
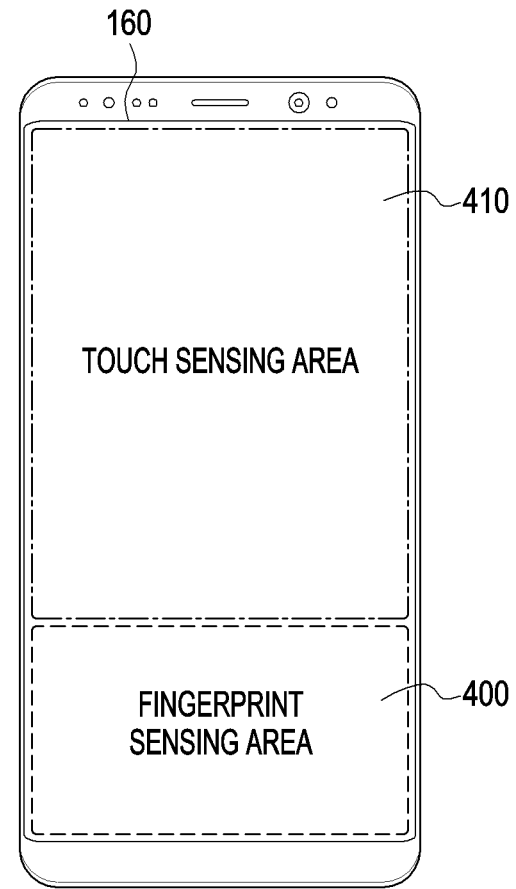

FIGS. 4A and 4B are views illustrating an example full sensing mode and an example partial sensing mode according to various embodiments. Described below is an embodiment in which the fingerprint sensor (e.g., the fingerprint sensor 200 of FIG. 2A), according to various embodiments, is included in the electronic device 101 and is implemented as a component of the electronic device 101.

As used herein, the term "mode," "set to specific mode," or "switch to specific mode" is one mentioned for ease of description of various functions/operations performed according to various embodiments of the disclosure. That is, the term "mode" as used herein means the state itself of a specific function(s) or operation(s) being performed. Thus, the phrase "set to specific mode" may simply mean switching to the state of a function(s) or operation(s) according to the specific mode being able to be performed (in other words, set to the environment) but does not mean that there should be an input (e.g., user input) for "setting to the specific mode" or "switching to the specific mode" nor does it that a change should be made to specific hardware and/or software.

Referring to FIG. 4A, according to various embodiments of the disclosure, the electronic device (e.g., the processor 120 of FIG. 1) may set the operation mode of the electronic device 101 to a full sensing mode to sense the user's fingerprint (e.g., the fingerprint 300 of FIG. 3A). According to various embodiments, in the full sensing mode, the electronic device (e.g., the processor 120 of FIG. 1) may sense the user's fingerprint over the entire area of the display device 160 (or the display panel 250 of FIG. 2D) of the electronic device 101. In other words, the electronic device (e.g., the processor 120 of FIG. 1) may control the fingerprint sensor (e.g., the fingerprint sensor 200 of FIG. 2A) so that the entire area of the display device 160 operates as a fingerprint sensing area 400. According to various embodiments, in the full sensing mode, in order to obtain the user's fingerprint image, the electronic device (e.g., the processor 120 of FIG. 1) may control the read-out circuit (e.g., the read-out circuit 220 of FIG. 2A) to transmit a driving signal to all the Tx electrodes 222a of the fingerprint sensor. Further, according to various embodiments, in the full sensing mode, in order to obtain the user's fingerprint image, the electronic device (e.g., the processor 120 of FIG. 1) may control the read-out circuit 220 to obtain capacitance variation information for all the Rx electrodes 224a of the fingerprint sensor.

Referring to FIG. 4B, according to various embodiments, the electronic device (e.g., the processor 120 of FIG. 1) may set the operation mode of the electronic device 101 to a partial sensing mode to sense the user's fingerprint. According to various embodiments, the partial sensing mode may mean a mode for sensing the user's fingerprint using the fingerprint sensing area 400 provided via a portion of the display device 160 (or the display panel 250 of FIG. 2A), determined according to various embodiments mentioned in the disclosure. According to various embodiments, in the partial sensing mode, the electronic device (e.g., the processor 120 of FIG. 1) may control the read-out circuit 220 so that only the operation of sensing (or detecting) the user's touch input is performed in the other areas (which may be referred to herein as a "touch sensing area 410") than the fingerprint sensing area 400. Further, in the partial sensing mode, the electronic device (e.g., the processor 120 of FIG. 1), according to various embodiments, may control the read-out circuit 220 to perform only the operation of obtaining the user's fingerprint image in the fingerprint sensing area 400. According to various embodiments, the read-out circuit 220 may be disposed in a lower side (or lower end) of the electronic device 101 as viewed from over the front surface of the display device 160 of the electronic device 101. In this case, according to various embodiments, the read-out circuit 220 may be disposed not to overlap the display device 160 (or an area identified by the display device 160). However, this is merely an example. The read-out circuit 220 may be disposed in various positions (or portions) inside the electronic device 101, and at least a portion of the read-out circuit 220 may be disposed to overlap the display device 160, inside the electronic device 101.

According to various embodiments, in the partial sensing mode, the electronic device (e.g., the processor 120 of FIG. 1) may control the read-out circuit 220 to transmit a driving signal to obtain the user's fingerprint image for all the Tx electrodes corresponding to the area determined to be the fingerprint sensing area 400. According to various embodiments, in the partial sensing mode, the electronic device (e.g., the processor 120 of FIG. 1) may control the read-out circuit 220 to sense no fingerprint while sensing only the user's touch in the other area (e.g., the touch sensing area 410) than the area determined to be the fingerprint sensing area 400. Thus, according to various embodiments, the electronic device (e.g., the processor 120 of FIG. 1) may control the read-out circuit not to transmit a driving signal to all the Tx electrodes corresponding to the other area than the area determined to be the fingerprint sensing area 400. For example, according to various embodiments, the electronic device (e.g., the processor 120 of FIG. 1) may perform control to transmit a driving signal only to a designated multiplexer (e.g., the multiplexer 240 of FIG. 2B) at designated intervals, thereby controlling the read-out circuit 220 so that only the user's touch is sensed. According to various embodiments of the disclosure, a switch (not shown) may be used interchangeably/alternatively to the multiplexer (e.g., the multiplexer 240 of FIG. 2B). For example, according to various embodiments, in the partial sensing mode, the electronic device (e.g., the processor 120 of FIG. 1) may control a first switch to short the switch (e.g., the first switch) corresponding to the fingerprint sensing area 400. According to various embodiments, in the partial sensing mode, the electronic device (e.g., the processor 120 of FIG. 1) may control a second switch to open the switch (e.g., the second switch) corresponding to the other area than fingerprint sensing area 400. Or, according to various embodiments, the electronic device (e.g., the processor 120 of FIG. 1) may control the read-out circuit 220 to obtain capacitance variation information only for the Rx electrodes corresponding to the Tx electrodes, to which the driving signal has been transmitted (or applied), even for the Rx electrodes corresponding to the other area than the area determined to be the fingerprint sensing area 400. According to various embodiments, in the partial sensing mode, the electronic device (e.g., the processor 120 of FIG. 1) may control the fingerprint sensor 200 to sense the user's touch input (e.g., a touch gesture) even in the fingerprint sensing area 400. That is, according to various embodiments, the fingerprint sensing area 400 may be controlled to sense only the user's fingerprint or to sense the user's fingerprint or touch input, by the electronic device (e.g., the processor 120 of FIG. 1).

Figure 4C:
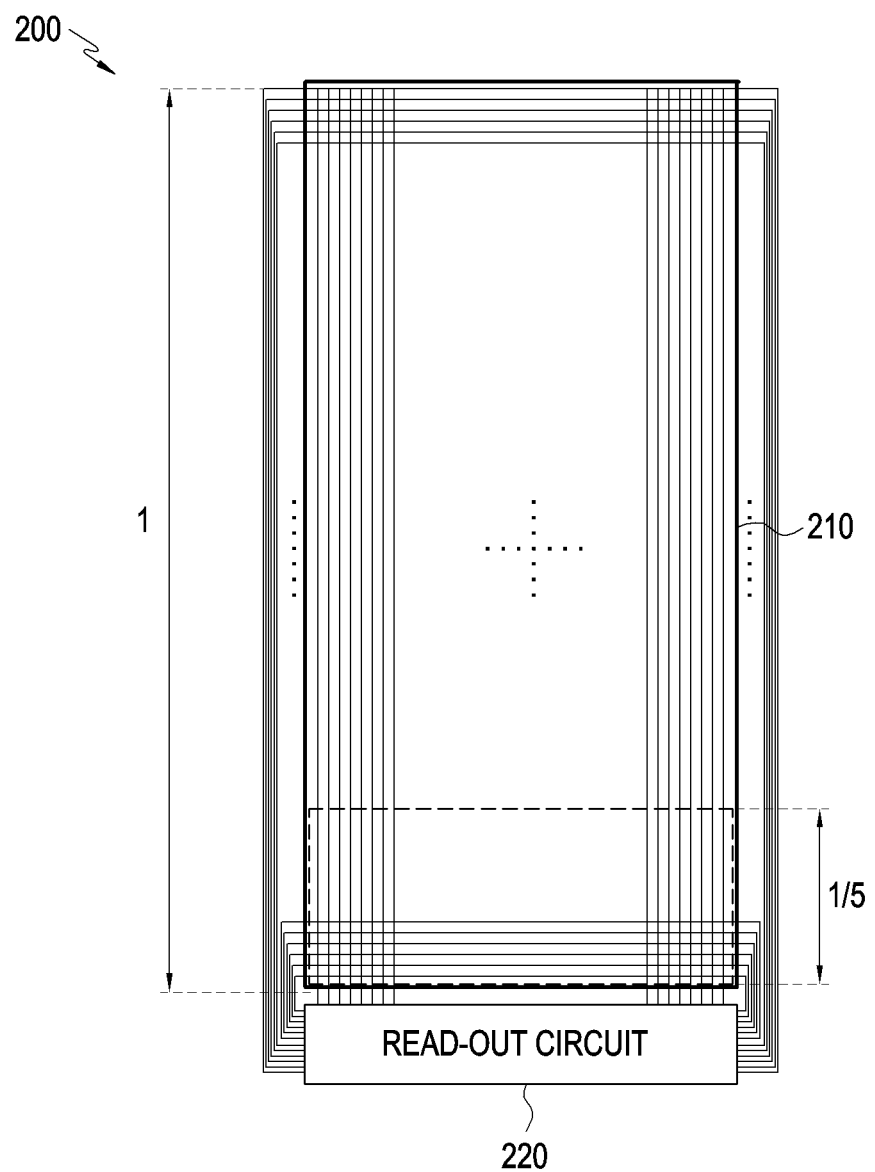
FIGS. 4C and 4D are views illustrating the operation of determining a partial sensing area by an electronic device, based on pre-designated information for a fingerprint sensing area in a partial sensing mode.
Figure 4D:
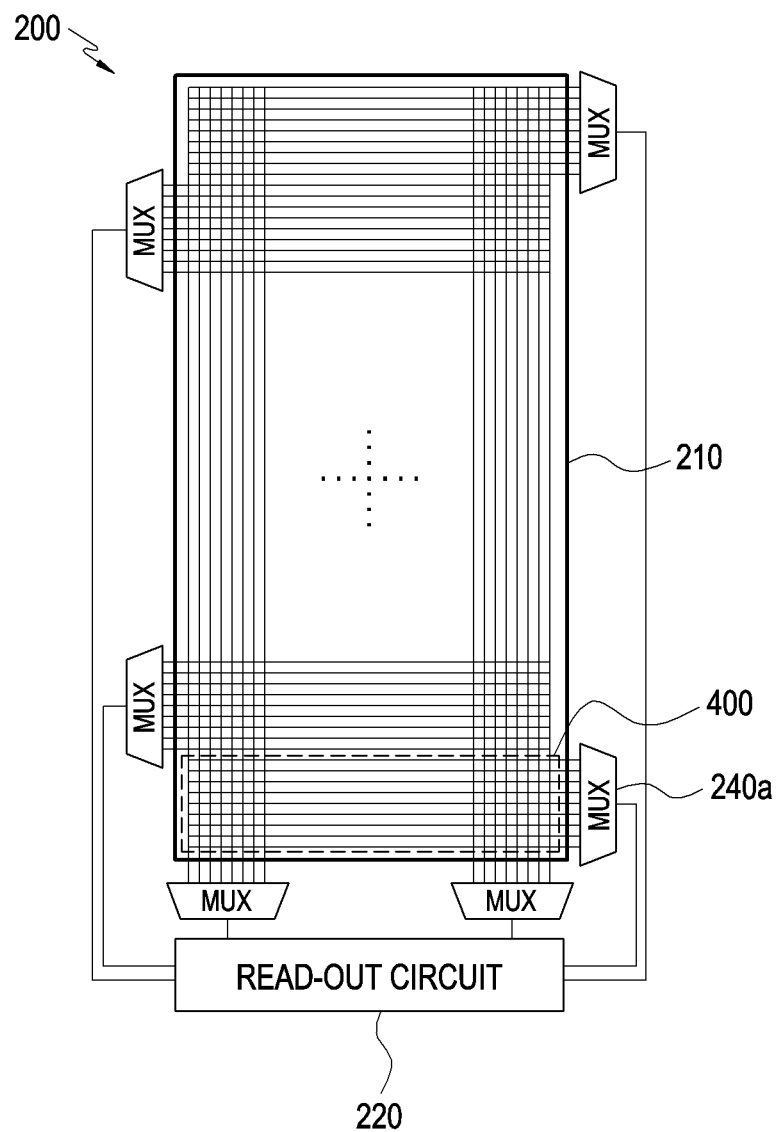

FIGS. 4C and 4D are views illustrating the operation of determining a partial sensing area by an electronic device, based on pre-designated information for a fingerprint sensing area in a partial sensing mode.

Referring to FIG. 4C, according to various embodiments, in the partial sensing mode, the electronic device (e.g., the processor 120 of FIG. 1) may determine the fingerprint sensing area 400 according to a designated size (e.g., ⅕ of the full size (1) of the touch panel 210). Information about the designated size may be stored in the electronic device (e.g., the memory 130 of FIG. 1).

Referring to FIG. 4D, according to various embodiments, in the partial sensing mode, the electronic device (e.g., the processor 120 of FIG. 1) may determine the fingerprint sensing area 400 in units of multiplexers (e.g., the multiplexer 240 of FIG. 2B). According to various embodiments, the electronic device (e.g., the processor 120 of FIG. 1) may control the read-out circuit 220 so that at least one multiplexer is included in the fingerprint sensing area 400. For example, according to various embodiments, the electronic device (e.g., the processor 120 of FIG. 1) may determine that the area including the Tx electrodes connected with any one multiplexer (e.g., a first multiplexer 240*a*) among a plurality of multiplexers (e.g., the multiplexer 240 of FIG. 2B) is the partial sensing area 400. According to various embodiments of the disclosure, information about which one is to be selected from among the multiplexers (e.g., the multiplexer 240 of FIG. 2B) may previously be stored in the electronic device (e.g., the memory 130 of FIG. 1).

Figure 5A:
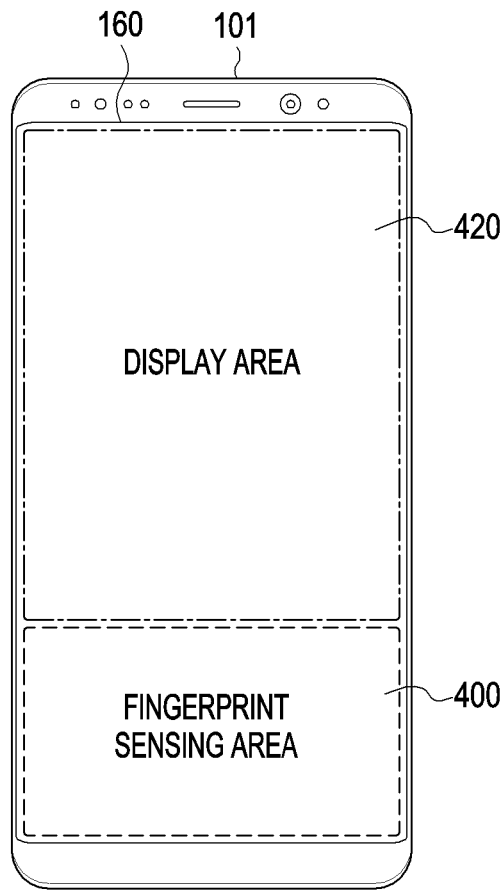
FIGS. 5A and 5B are views illustrating an example display area and an example fingerprint sensing area in a partial sensing mode according to various embodiments.
Figure 5B:
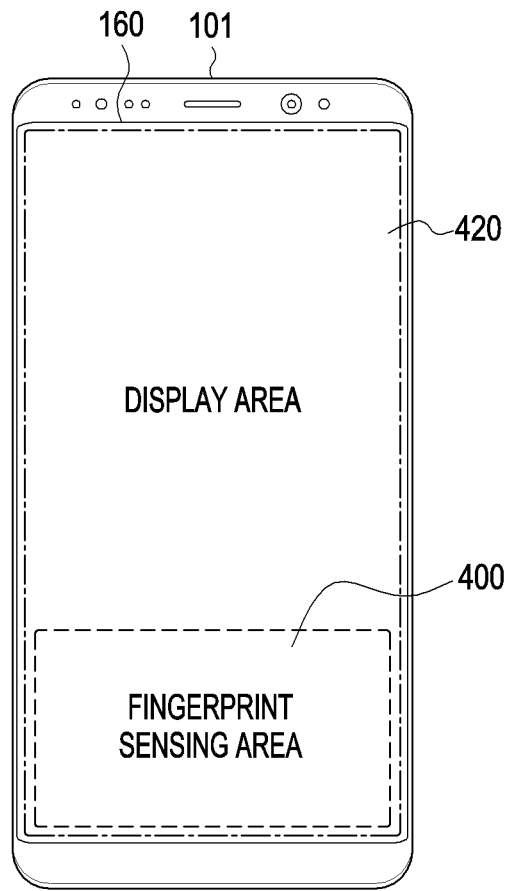

FIGS. 5A and 5B are views illustrating an example display area and an example fingerprint sensing area in a partial sensing mode according to various embodiments.

Referring to FIG. 5A, according to various embodiments, in the partial sensing mode, the fingerprint sensing area 400 may be distinguished from the display area 420 where at least one object (e.g., an application window) is displayed. For example, according to various embodiments, the electronic device (e.g., the processor 120 of FIG. 1) may display at least one object (e.g., an application execution screen) on the display device 160, only for the display area 420.

Referring to FIG. 5B, according to various embodiments, in the partial sensing mode, the electronic device (e.g., the processor 120 of FIG. 1) may perform control so that the display area 420 overlaps the fingerprint sensing area 400.

Figure 6A:
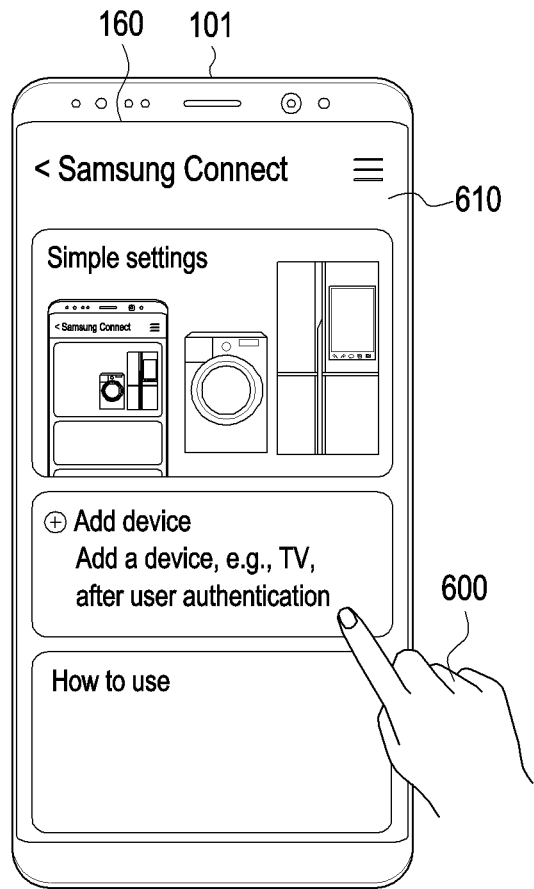
FIGS. 6A, 6 B and -6C are views illustrating implementation examples of the embodiments shown in FIGS. 5A and 5B, according to various embodiments.
Figure 6B:
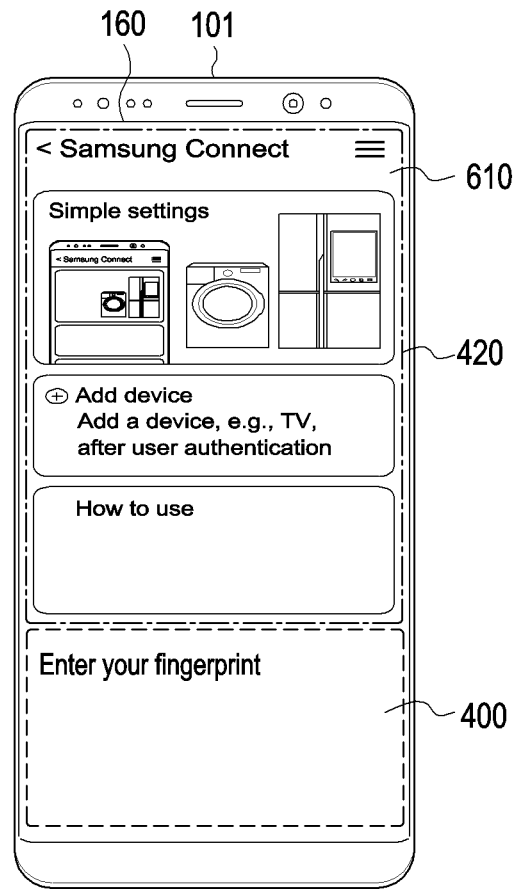
Figure 6C:
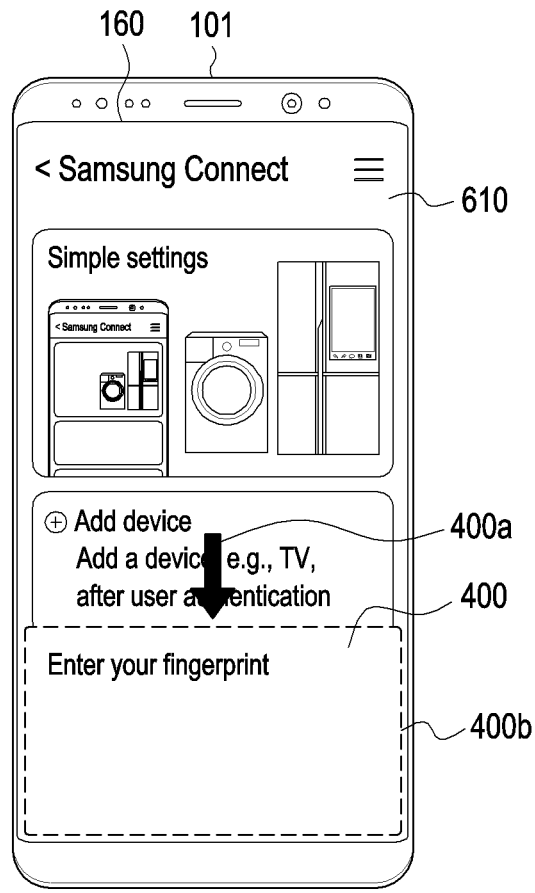

FIGS. 6A to 6C are views illustrating implementation examples of the embodiments shown in FIGS. 5A and 5B, according to various embodiments. For ease of description, an example in which the operation mode of the electronic device 101 is set to the partial sensing mode is described with reference to FIGS. 6A to 6C.

Referring to FIG. 6A, according to various embodiments, an execution screen 610 of an application (e.g., Samsung Connect application), as at least one object, may be displayed on the display device 160 of the electronic device 101. The user 600 may input (e.g., touch input) a request for executing a specific function (e.g., add a device) on the application execution screen 610.

Referring to FIG. 6B, according to various embodiments, the electronic device (e.g., the processor 120 of FIG. 1) may display the execution screen 610, which is currently being executed, in the display area 420 and, according to various embodiments, provide information about the determined fingerprint sensing area 400. According to various embodiments, in the partial sensing mode, the electronic device (e.g., the processor 120 of FIG. 1) may provide information about the fingerprint sensing area 400 for the user to be able to recognize the fingerprint sensing area 400. According to various embodiments, the information about the fingerprint sensing area 400 may be provided to the user 600, based on at least one effect among visual effects (e.g., a visual guide), auditory effects (e.g., an audio sound), and tactile effects (e.g., vibration). FIG. 6B illustrates an embodiment in which information about the fingerprint sensing area 400 is provided to the user 600, based on a visual effect (the border (e.g., dashed lines)) of the fingerprint sensing area 400 and a guidance message ("Enter your fingerprint"), as the information about the fingerprint sensing area 400. According to various embodiments, other than the dashed line portion, coordinate information (e.g., coordinate information ("horizontal (0, 10 cm), vertical (0, 7 cm)") with respect to a bottom left portion of the display device when the display device is viewed from above the front surface) corresponding to the area defined in dashed lines may be provided to the user 600 based on at least one effect (e.g., a visual effect).

Referring to FIG. 6C, according to various embodiments, the electronic device (e.g., the processor 120 of FIG. 1) may display the application execution screen 610 and the fingerprint sensing area 400, with the application execution screen 610 overlapping the fingerprint sensing area 400. Referring to FIG. 6C, a visual effect on the fingerprint sensing area 400 may include an arrow 400*a*, a dashed line portion 400*b*, and a guidance message ("Enter your fingerprint"). However, this is merely an example, and the visual effect, according to various embodiments, is not limited by FIGS. 6B and 6C. According to various embodiments, the electronic device may register the user's fingerprint input (e.g., obtained) via the fingerprint sensing area 400 or authenticate the fingerprint (e.g., identify whether the user is a valid user).

Figure 7:
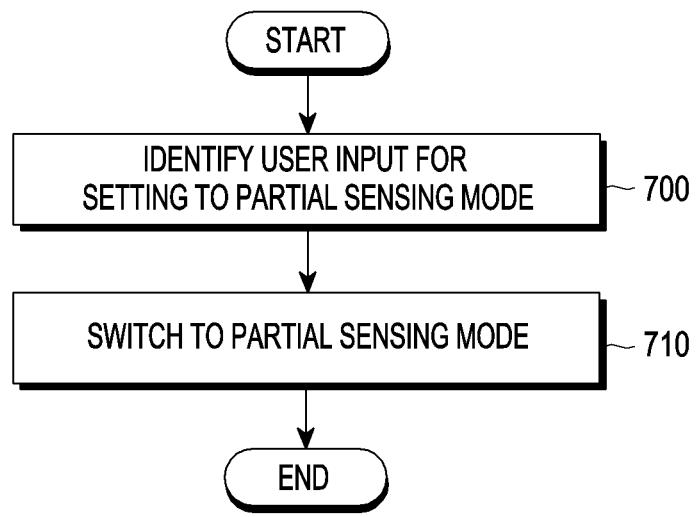
FIG. 7 is a flowchart illustrating an operation in which an operation mode of an electronic device is set (or switched) to a partial sensing mode according to a user input, according to various embodiments.

FIG. 7 is a flowchart illustrating an operation in which an operation mode of an electronic device is set (or switched) to a partial sensing mode according to a user (e.g., the user 600 of FIG. 6) input, according to various embodiments.

Referring to FIG. 7, according to various embodiments, the electronic device (e.g., the processor 120 of FIG. 1) may identify a user input for setting to the partial sensing mode in operation 700.

According to various embodiments, the electronic device (e.g., the processor 120 of FIG. 1) may switch to the partial sensing mode according to the identification of operation 700, in operation 710. Thus, the electronic device 101 may read out data from the Rx electrodes corresponding to the fingerprint sensing area 400.

Figure 8A:
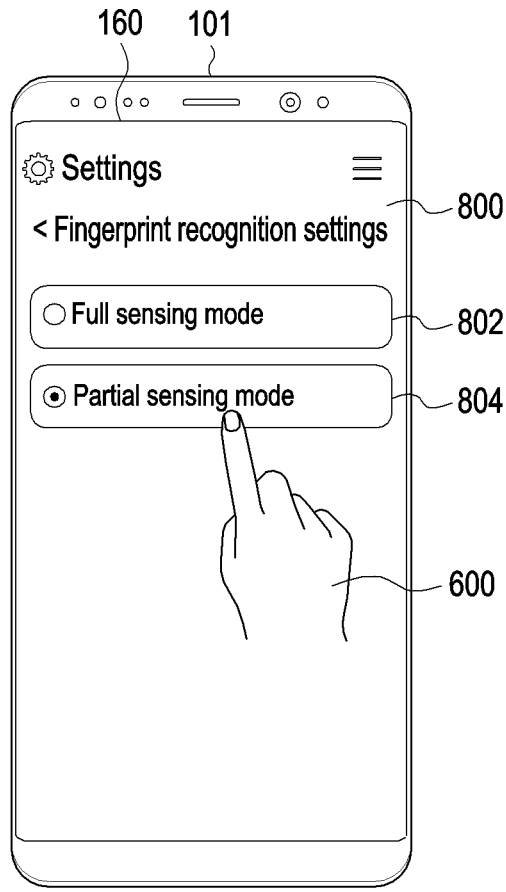
FIGS. 8A and 8B are views illustrating an implementation example of an operation in which an operation mode of an electronic device is set to a partial sensing mode according to a user input, according to various embodiments.
Figure 8B:
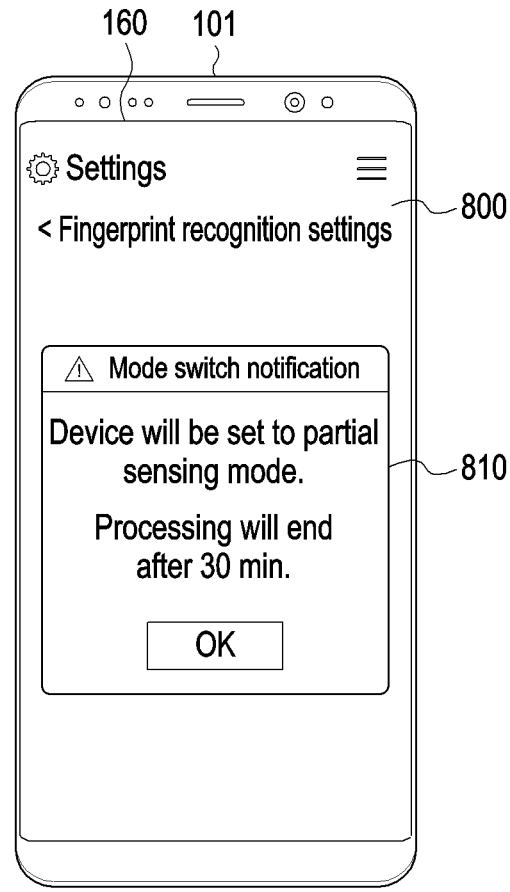

FIGS. 8A to 8C are views illustrating an implementation example of an operation in which an operation mode of an electronic device 101 is set to a partial sensing mode according to a user input, according to various embodiments.

Referring to FIG. 8A, according to various embodiments, the electronic device 101 may display a setting screen 800 including menu items (e.g. full sensing mode 802 and partial sensing mode 804) for configuring the fingerprint recognition environment using the display device 160. According to various embodiments, the electronic device 101 may receive, from the user 600, a selection input for switching to the partial sensing mode using the display device 160.

Referring to FIG. 8B, according to various embodiments, the electronic device 101 may display a notification message indicating that it has been set (or switched) to the partial sensing mode on the display device 160. According to various embodiments, when set to the partial sensing mode, the electronic device 101 may set a time (e.g., 30 minutes) while the electronic device 101 is operated in the partial sensing mode. According to various embodiments, the electronic device 101 may switch to the full sensing mode if the time during which the partial sensing mode is operated expires. According to various embodiments, the electronic device 101 may provide information (e.g., "It will be terminated after 30 minutes") about the time during which the electronic device 101 is operated in the partial sensing mode to the user using the notification message 810. According to various embodiments, when set to the partial sensing mode, the electronic device 101 may maintain the partial sensing mode until the user's input for switching is received, without setting (or designating) an expiration time.

According to various embodiments, upon identifying an occurrence of an event (e.g., a fingerprint authentication event) related to obtaining a fingerprint image after being set to the partial sensing mode according to various embodiments shown in FIGS. 8A and 8B, the electronic device 101 may perform operations (e.g., of FIGS. 6A to 6C) according to the partial sensing mode.

Figure 9:
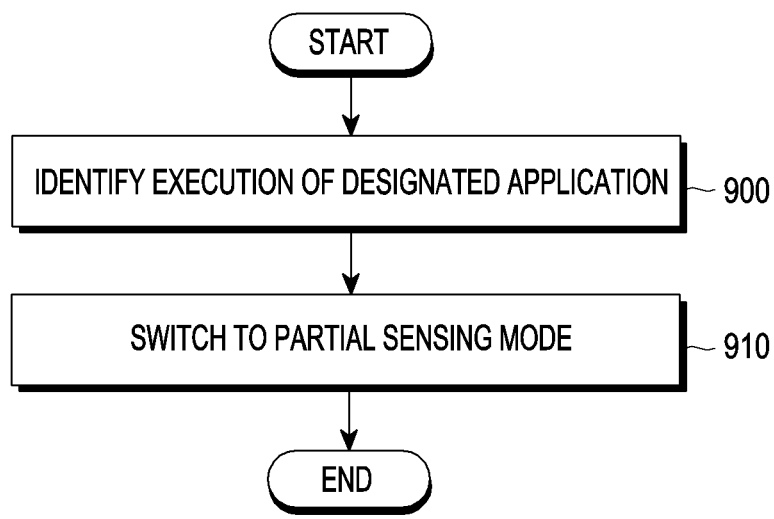
FIG. 9 is a flowchart illustrating an operation in which an operation mode of an electronic device is set to a partial sensing mode as a designated application is executed, according to various embodiments.

FIG. 9 is a flowchart illustrating an operation in which an operation mode of an electronic device (e.g., the electronic device 101 of FIG. 1) is set to a partial sensing mode as a designated application is executed, according to various embodiments.

Referring to FIG. 9, according to various embodiments, the electronic device (e.g., the processor 120 of FIG. 1) may identify execution of a designated application in operation 900.

According to various embodiments, the electronic device (e.g., the processor 120 of FIG. 1) may switch to the partial sensing mode according to the identification of operation 900, in operation 910.

Figure 10A:
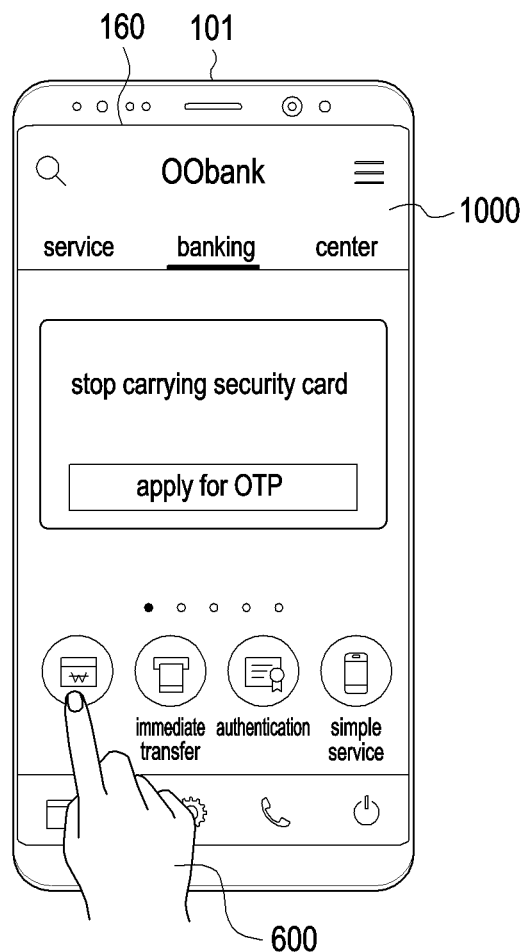
FIGS. 10A and 10B are views illustrating an implementation example of an operation in which an operation mode of an electronic device is set to a partial sensing mode as a designated application is executed, according to various embodiments.
Figure 10B:
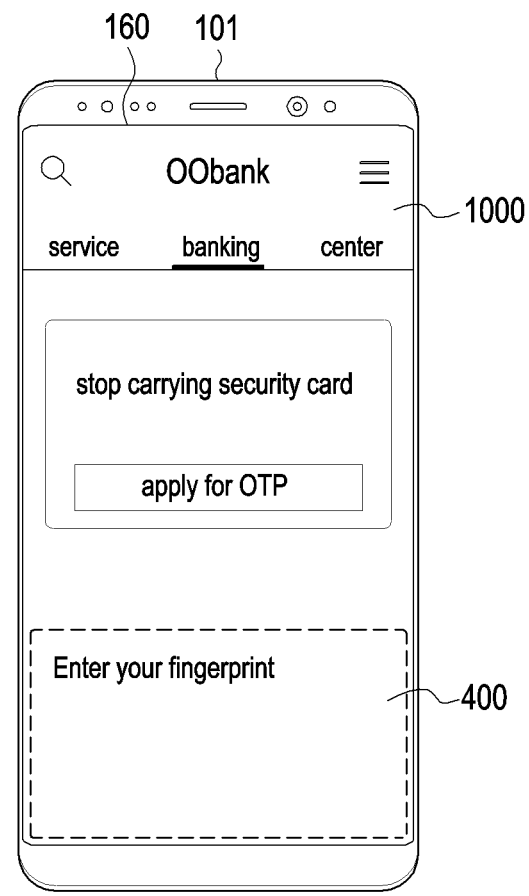

FIGS. 10A and 10B are views illustrating an implementation example of an operation in which an operation mode of an electronic device 101 is set to a partial sensing mode as a designated application is executed, according to various embodiments.

Referring to FIG. 10A, according to various embodiments, the electronic device 101 may identify execution of a designated application (e.g., an Internet banking application). According to various embodiments, the electronic device 101 may identify execution of the designated application and display an execution screen 1000 of the designated application on the display device 160. According to various embodiments, the designated application may information various applications, which require fingerprint authentication and rapid fingerprint sensing when the user uses at least some functions of the application, e.g., applications needing a high security level, such as an Internet banking application or payment application (e.g., Samsung Pay™ application or Samsung card application). According to various embodiments, information for the designated application may be previously stored in the electronic device (e.g., the memory 130 of FIG. 1). According to various embodiments, the information about the designated application may include an application selected (or designated) by the user. According to various embodiments, the information about the application selected by the user may be stored in the electronic device (e.g., the memory 130 of FIG. 1). According to various embodiments, upon identifying execution of the designated application, the electronic device 101 may automatically (or without the user's input) switch the operation mode of the electronic device 101 to the partial sensing mode. However, if the operation mode of the electronic device 101 is set to the partial sensing mode at the time when the execution of the designated application is identified, the electronic device 101 may maintain the current operation mode. Referring to FIG. 10A, according to various embodiments, the electronic device 101 may receive a selection input for a menu item (e.g., a "account inquiry" menu item) that requires fingerprint authentication from the user 600. According to various embodiments, the designated application may include an application which has a designated layout (e.g., an application configured to be displayed in a size of ⅔ of the full size of the screen (e.g., the display device 160 of FIG. 1)) or an application pre-configured to be automatically executed (e.g., switched) in the partial sensing mode when the application is executed.

Referring to FIG. 10B, according to various embodiments, as a selection input for a menu item requiring fingerprint authentication is received from the user 600, the electronic device 101 may identify an occurrence of an event related to obtaining the fingerprint image (e.g., the fingerprint image 330 of FIG. 3C). According to various embodiments, the electronic device 101 may provide the user 600 with information (e.g., a dashed line portion and guidance message (e.g., "Enter your fingerprint")) about the position of the fingerprint sensing area 400 determined according to various embodiments. According to various embodiments, the electronic device 101 may sense the fingerprint of the user 600 via the fingerprint sensing area 400.

Figure 11:
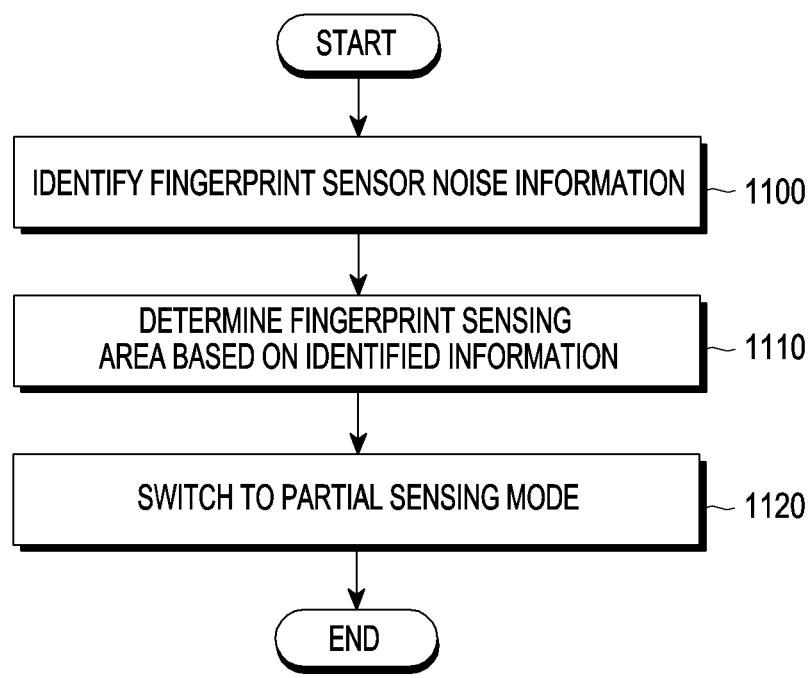
FIG. 11 is a flowchart illustrating an operation in which an electronic device determines a fingerprint sensing area according to information about fingerprint sensor noise and switches to a partial sensing mode based on the determined fingerprint sensing area, according to various embodiments.

FIG. 11 is a flowchart illustrating an operation in which an electronic device determines a fingerprint sensing area according to information about fingerprint sensor noise and switches to a partial sensing mode based on the determined fingerprint sensing area, according to various embodiments.

Referring to FIG. 11, according to various embodiments, the electronic device (e.g., the processor 120 of FIG. 1) may identify noise information about the fingerprint sensor in operation 1100.

According to various embodiments, the electronic device (e.g., the processor 120 of FIG. 1) may determine a fingerprint sensing area based on the information identified according to operation 1100, in operation 1110.

According to various embodiments, the electronic device (e.g., the processor 120 of FIG. 1) may switch to the partial sensing mode based on the fingerprint sensing area determined according to operation 1110, in operation 1120.

Figure 12A:
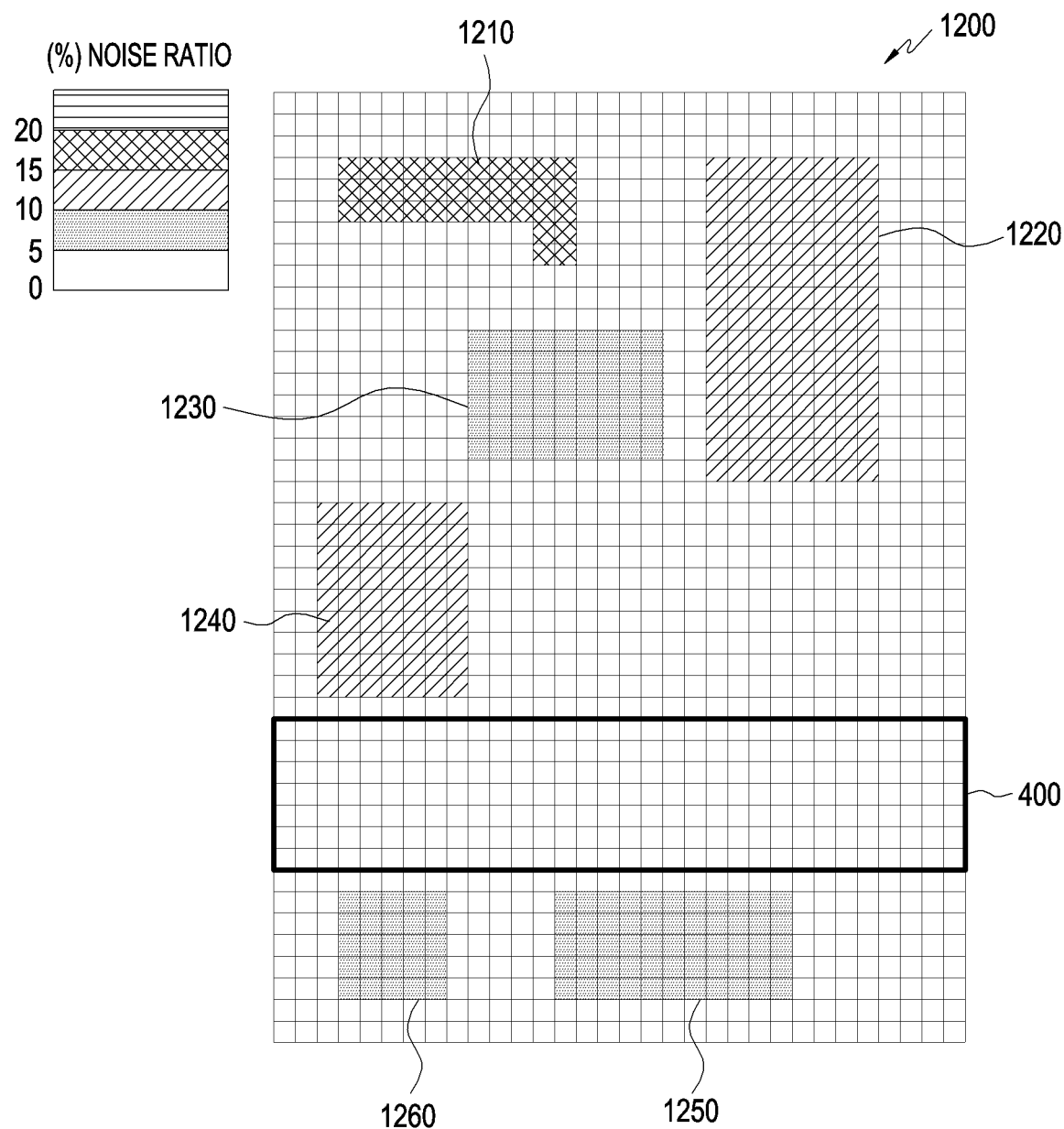
FIG. 12A is a view illustrating an example for describing a noise map as an embodiment for noise information for a fingerprint sensor, according to various embodiments.

FIG. 12A is a view illustrating an example for describing a noise map as an embodiment for noise information for a fingerprint sensor, according to various embodiments.

Referring to FIG. 12A, according to various embodiments, the electronic device (e.g., the processor 120 of FIG. 1) may generate a noise map 1200 for the fingerprint sensor 300 to identify the noise information about the fingerprint sensor (e.g., the fingerprint sensor 200 of FIG. 2A). According to various embodiments, the electronic device (e.g., the processor 120 of FIG. 1) may generate a noise map 1200 in the state of there not being the user's touch input. To that end, a read-out circuit (e.g., the read-out circuit 220 of FIG. 2A) may be controlled to perform scanning on a touch panel (e.g., the touch panel 210 of FIG. 2A (or, each touch sensor included in the touch panel 210)). Information about the noise map 1200, according to various embodiments, generated according to the result of scanning may be provided to the processor (e.g., the processor of FIG. 1) from the read-out circuit (e.g., the read-out circuit 220 of FIG. 2A). According to various embodiments, the noise map 1200 may include relative noise ratio information for the touch panel 210. For example, referring to the noise map 1200 shown in FIG. 12A, the electronic device (e.g., the processor 120 of FIG. 1), according to various embodiments, may identify that the touch sensors included in a first area 1210 of the touch panel 210 are in the state of having a relatively 15% to 20% higher noise ratio as compared with the voltage value or capacitance value of the touch sensor in the state of there being no noise, based on the noise map 1200. The electronic device (e.g., the processor 120 of FIG. 1), according to various embodiments, may identify that the touch sensors included in a second area 1220 and fourth area 1240 of the touch panel 1220 are in the state of having a relatively 10% to 15% higher noise ratio as compared with the voltage value or capacitance value of the touch sensor in the state of there being no noise, based on the noise map 1200. The electronic device (e.g., the processor 120 of FIG. 1), according to various embodiments, may identify that the touch sensors included in a third area 1230, fifth area 1250, and sixth area 1260 are in the state of having a relatively 5% to 10% higher noise ratio as compared with the voltage value or capacitance value of the touch sensor in the state of there being no noise, based on the noise map 1200. According to various embodiments, the electronic device (e.g., the processor 120 of FIG. 1) may determine that an area with a relatively low noise ratio (e.g., an area in which the noise ratio is "0% to less than 5%") is the fingerprint sensing area 400 based on the noise map 1200. According to various embodiments, the range (e.g., 0% to less than 5%) or threshold (e.g., less than 10%) of the noise ratio for determining the fingerprint sensing area 400 based on the noise map 1200 may be previously stored in the electronic device (e.g., the electronic device 101 of FIG. 1) or may be selected by the user.

According to various embodiments, the square grid shape of the noise map 1200 may correspond to the shape of the arrangement of the electrodes (e.g., the Tx electrodes 222a and Rx electrodes 224a of FIG. 2A) in the touch panel (e.g., the touch panel 210 of FIG. 2A). In other words, one grid in the noise map 1200 and one touch sensor included in the touch panel (e.g., the touch panel 210 of FIG. 2A) may have the relationship of corresponding to each other.

According to various embodiments, the electronic device (e.g., the read-out circuit 220 of FIG. 2A) may modulate the scanning frequency or scanning voltage into a specific frequency value or voltage value to detect noise (or a relative noise ratio) for the touch panel 210 and transmit the signal according to the modulated frequency or voltage to the Tx driving electrodes (e.g., the Tx driving electrodes 222a of FIG. 2A). According to various embodiments, various techniques for detecting noise for the touch sensor may be applied to a method for detecting noise (or a relative noise ratio) of the touch panel 210 or a method for generating the noise map 1200.

Figure 12B:
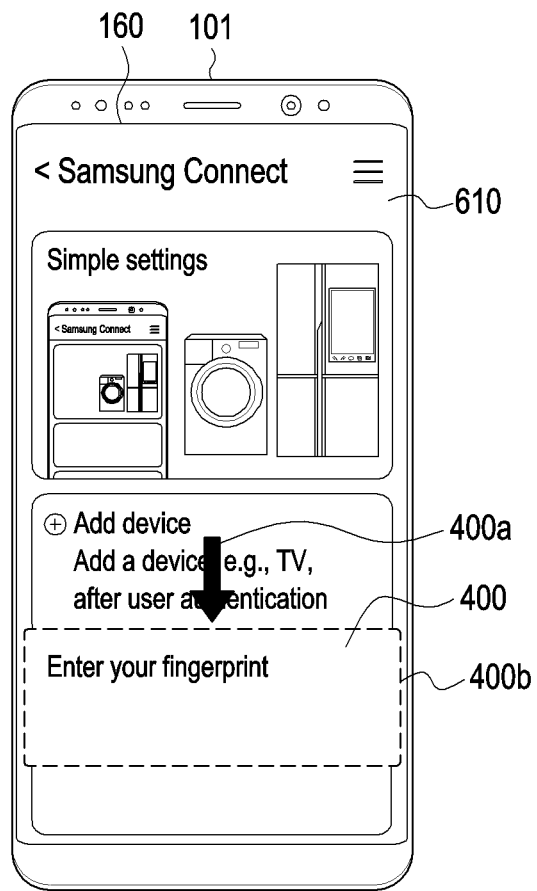
FIG. 12B is a view illustrating an implementation example for an operation in which an operation mode of an electronic device is set to a partial sensing mode based on the position of a fingerprint sensing area determined according to noise information, according to various embodiments.

FIG. 12B is a view illustrating an implementation example for an operation in which an operation mode of an electronic device is set to a partial sensing mode based on the position of a fingerprint sensing area determined according to noise information, according to various embodiments.

Referring to FIG. 12B, according to various embodiments, the electronic device (e.g., the processor 120 of FIG. 1) may provide information about the fingerprint sensing area 400 to correspond to the position of the fingerprint sensing area 400 determined based on the noise map 1200. For example, since the noise map 1200 may have a shape corresponding to the touch panel 210, the electronic device 101 may determine the position on the touch panel (e.g., the touch panel 210 of FIG. 2A) corresponding to the position of the fingerprint sensing area 400 determined based on the noise map 1200. According to various embodiments, the electronic device 101 may display information (e.g., a dashed line portion 400b and an arrow 400a) indicating the fingerprint sensing area 400 in the position on the display device (e.g., the display device 160 of FIG. 1), corresponding to the determined position on the touch panel. The positions of the fingerprint sensing area 400 shown in FIGS. 12A and 12B are example positions for describing various embodiments. According to various embodiments, the position of the fingerprint sensing area 400 may be varied.

Figure 13:
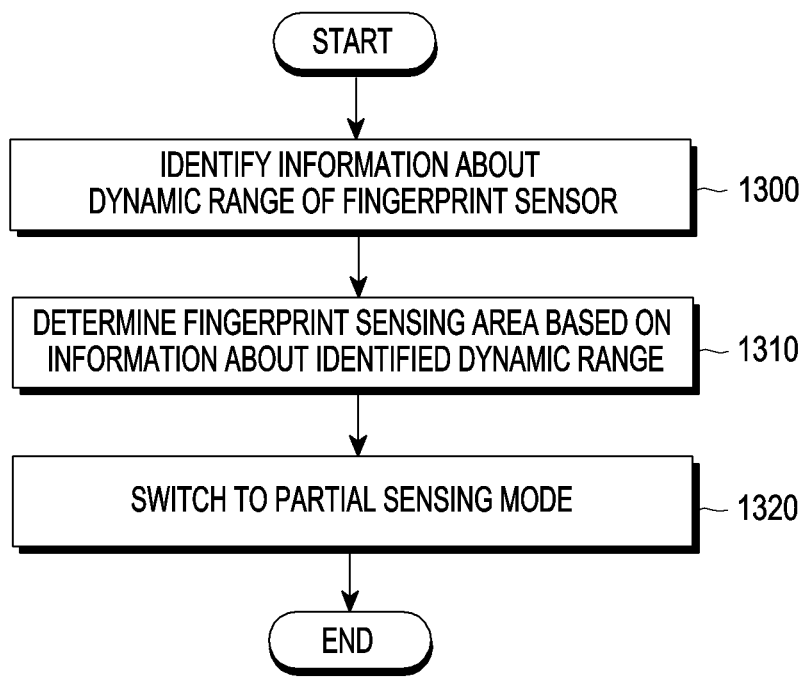
FIG. 13 is a flowchart illustrating an operation in which an electronic device determines a fingerprint sensing area according to information about a dynamic range of a fingerprint sensor and switches to a partial sensing mode based on the determined fingerprint sensing area, according to various embodiments.

FIG. 13 is a flowchart illustrating an operation in which an electronic device determines a fingerprint sensing area according to information about a dynamic range of a fingerprint sensor and switches to a partial sensing mode based on the determined fingerprint sensing area, according to various embodiments.

Referring to FIG. 13, according to various embodiments, the electronic device (e.g., the processor 120 of FIG. 1) may identify information about a dynamic range of a fingerprint sensor in operation 1300. According to various embodiments, dynamic range information for the fingerprint sensor (e.g., the fingerprint sensor 200 of FIG. 2A) or the touch sensor of the fingerprint sensor may be generated in the format of a dynamic range map indicating a dynamic range distribution as shown in FIG. 12A. According to various embodiments, the dynamic range may be expressed in voltage units, such as −3V to 3V, or in capacitance units (e.g., femto farad (fP)). According to various embodiments, the electronic device (e.g., the read-out circuit 220 of FIG. 2A) may perform a scanning operation on each touch sensor to identify the dynamic range of each touch sensor.

According to various embodiments, the electronic device (e.g., the processor 120 of FIG. 1) may determine a fingerprint sensing area based on the information identified according to operation 1300, in operation 1310. According to various embodiments, the electronic device (e.g., the processor 120 of FIG. 1) may determine that a specific area of a touch panel (e.g., the touch panel 210 of FIG. 2A) with a broad (or large) dynamic range is the fingerprint sensing area 400.

According to various embodiments, the electronic device (e.g., the processor 120 of FIG. 1) may switch to the partial sensing mode based on the fingerprint sensing area determined according to operation 1310, in operation 1320.

According to various embodiments, the electronic device (e.g., the processor 120 of FIG. 1) may generate a dynamic range map based on dynamic range information about each touch sensor, stored in the electronic device (e.g., the memory 130 of FIG. 1) in the format of a lookup table (LUT), without performing scanning for generating the dynamic range map indicating the dynamic range distribution or may determine the fingerprint sensing area 400 based on the lookup table without generating a dynamic range map.

The description made in connection with FIGS. 11 to 12B may apply likewise to the rest of FIG. 13.

Figure 14A:
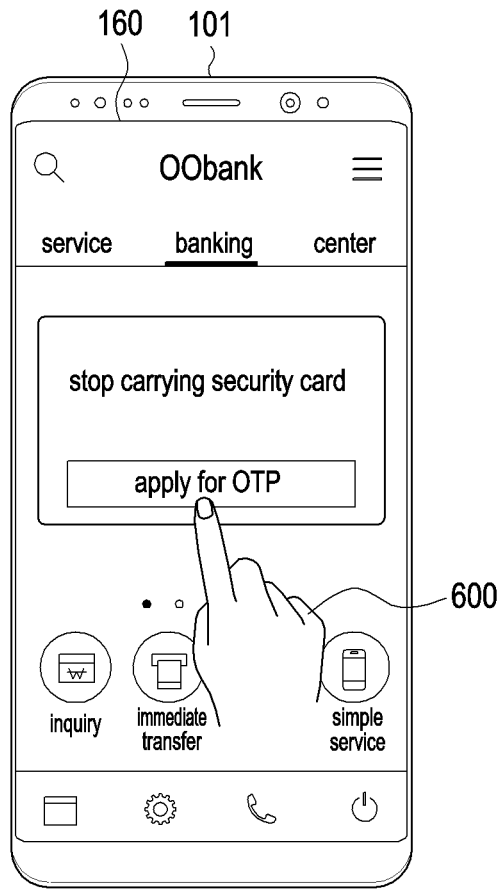
FIGS. 14A, 14B and 14C are views illustrating an example for describing an operation in which an electronic device switches its operation mode to a partial sensing mode when no user finger motion is detected, according to various embodiments.
Figure 14B:
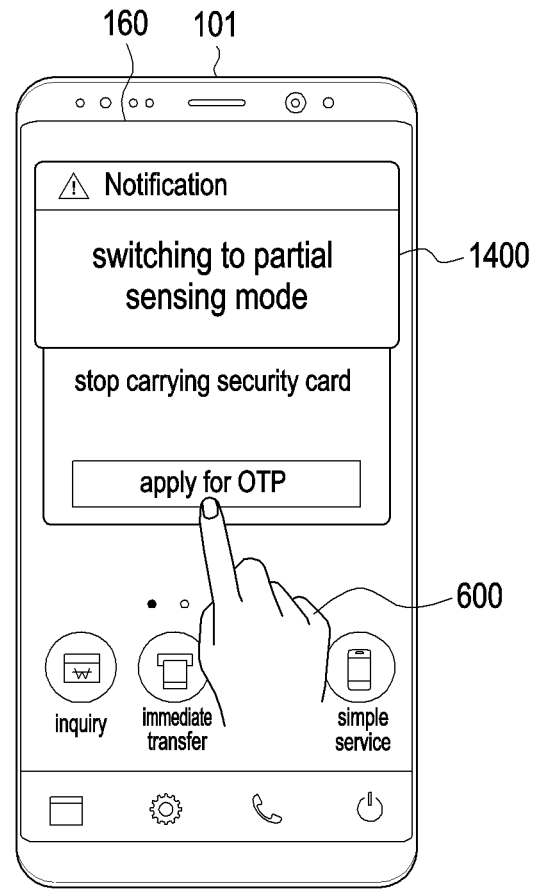
Figure 14C:
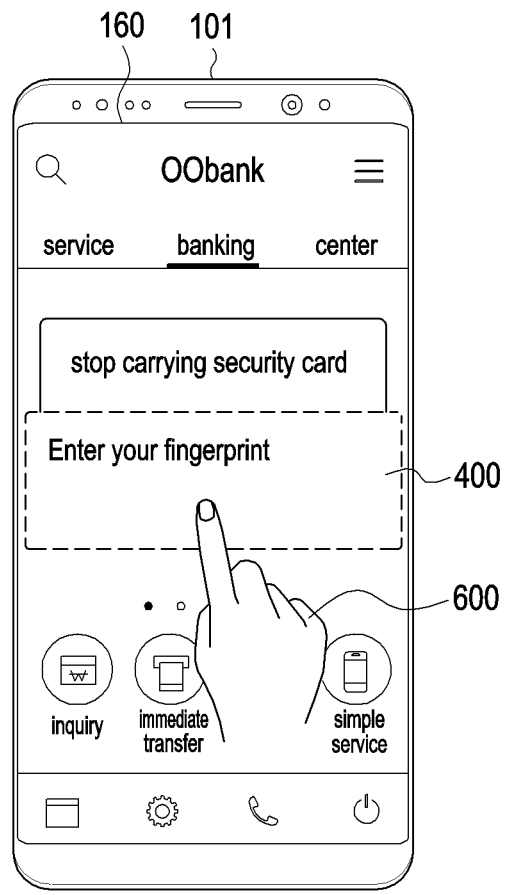

FIGS. 14A to 14C are views illustrating an example for describing an operation in which an electronic device 101 switches its operation mode to a partial sensing mode when no motion is detected for a finger of the user 600, according to various embodiments.

Referring to FIG. 14A, according to various embodiments, the electronic device 101 may sense a long touch input (e.g., no motion is sensed 3 seconds or more from the time when the first touch input of the user 600 is sensed) of the user 600 on a specific portion of the display device 160.

Referring to FIG. 14B, according to various embodiments, upon sensing the long touch input of the user 600, the electronic device 101 may switch the operation mode from the full sensing mode to the partial sensing mode. According to various embodiments, the electronic device 101 may display a notification message 1400 indicating that it has switched to the partial sensing mode on the display device 160.

Referring to FIG. 14C, according to various embodiments, the electronic device 101 may configure a fingerprint sensing area 400 for recognizing a fingerprint of the user 600 around the point where the finger of the user 600 is positioned according to the partial sensing mode and provide information (e.g., the border (dashed line portion) of the fingerprint sensing area 400) about the fingerprint sensing area 400. According to various embodiments, the electronic device 101 may sense the fingerprint of the user 600 via the fingerprint sensing area 400.

Figure 15:
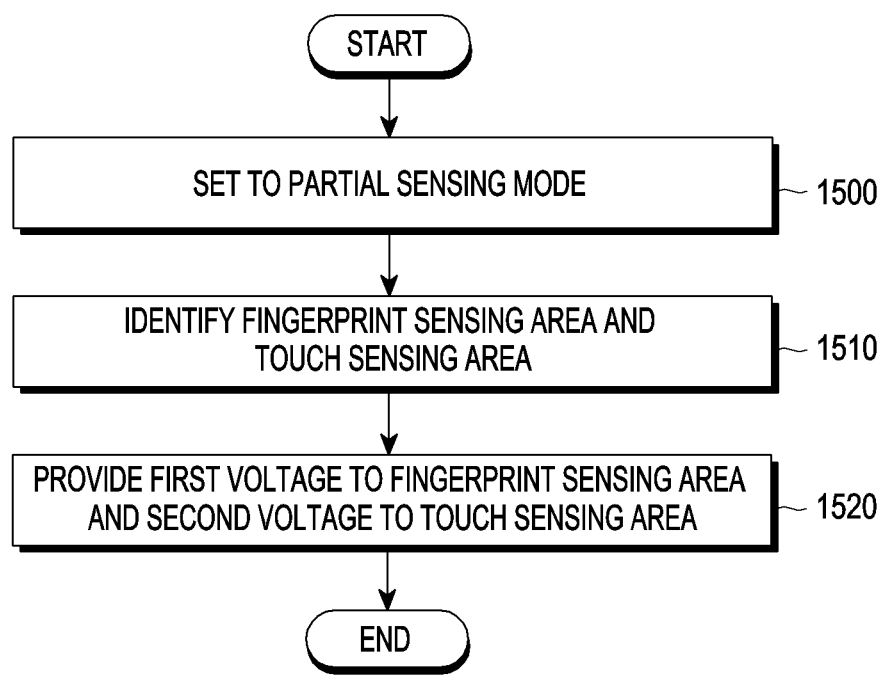
FIG. 15 is a flowchart illustrating the operation of providing different voltages to a fingerprint sensing area and a touch sensing area, according to various embodiments.

FIG. 15 is a flowchart illustrating the operation of providing different voltages to a fingerprint sensing area and a touch sensing area, according to various embodiments.

Referring to FIG. 15, according to various embodiments, the electronic device (e.g., the processor 120 of FIG. 1) may set the operation mode of the electronic device to the partial sensing mode in operation 1500.

According to various embodiments, the electronic device (e.g., the processor 120 of FIG. 1) may identify a fingerprint sensing area and a touch sensing area in operation 1510.

According to various embodiments, in operation 1520, the electronic device (e.g., the processor 120 of FIG. 1) may provide a first voltage and a second voltage for the fingerprint sensing area and the touch sensing area, respectively, identified according to operation 1510.

Figure 16A:
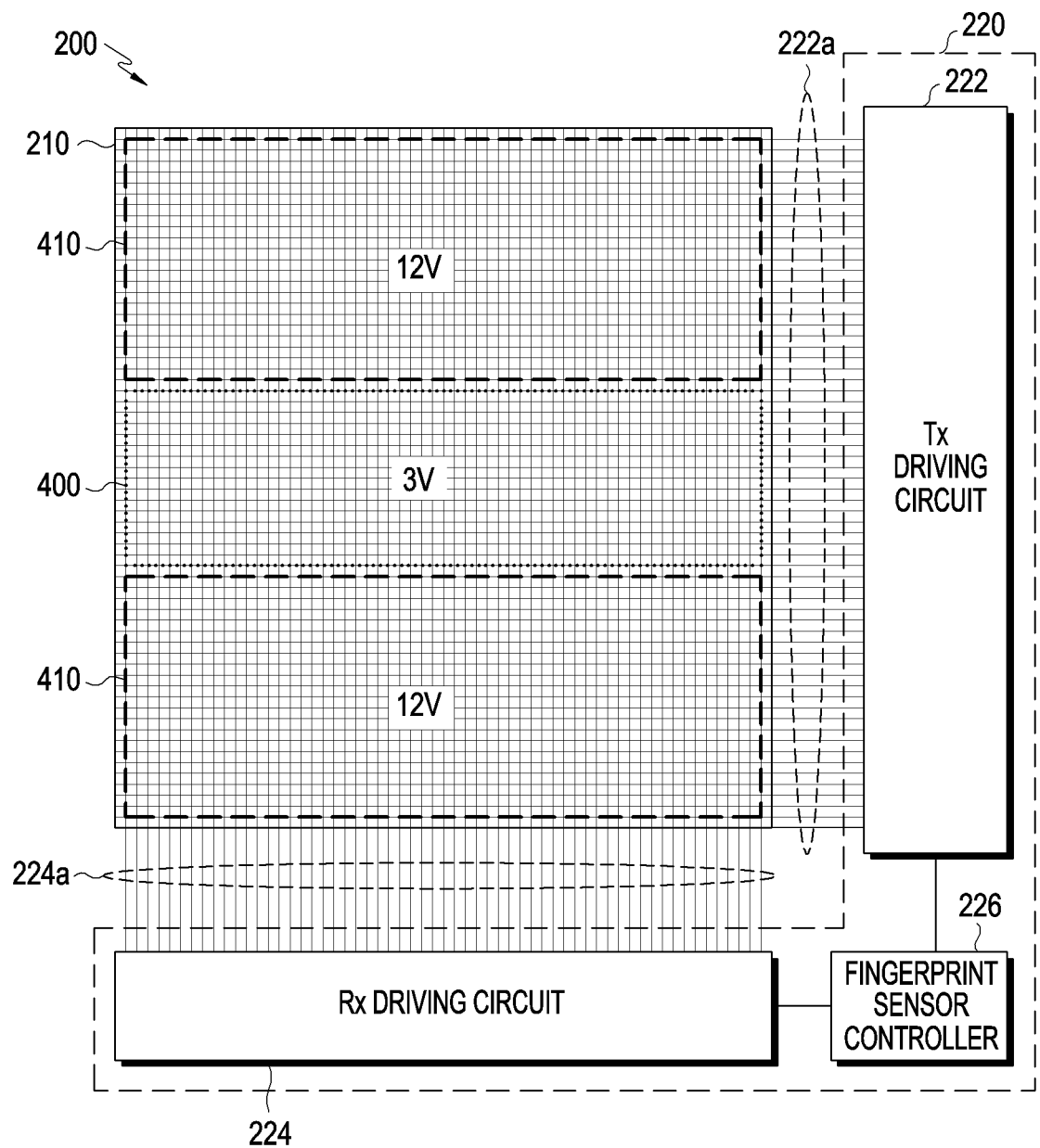
FIGS. 16A and 16B are views illustrating an implementation example for the operation of providing different voltages to a fingerprint sensing area and a touch sensing area according to various embodiments.
Figure 16B:
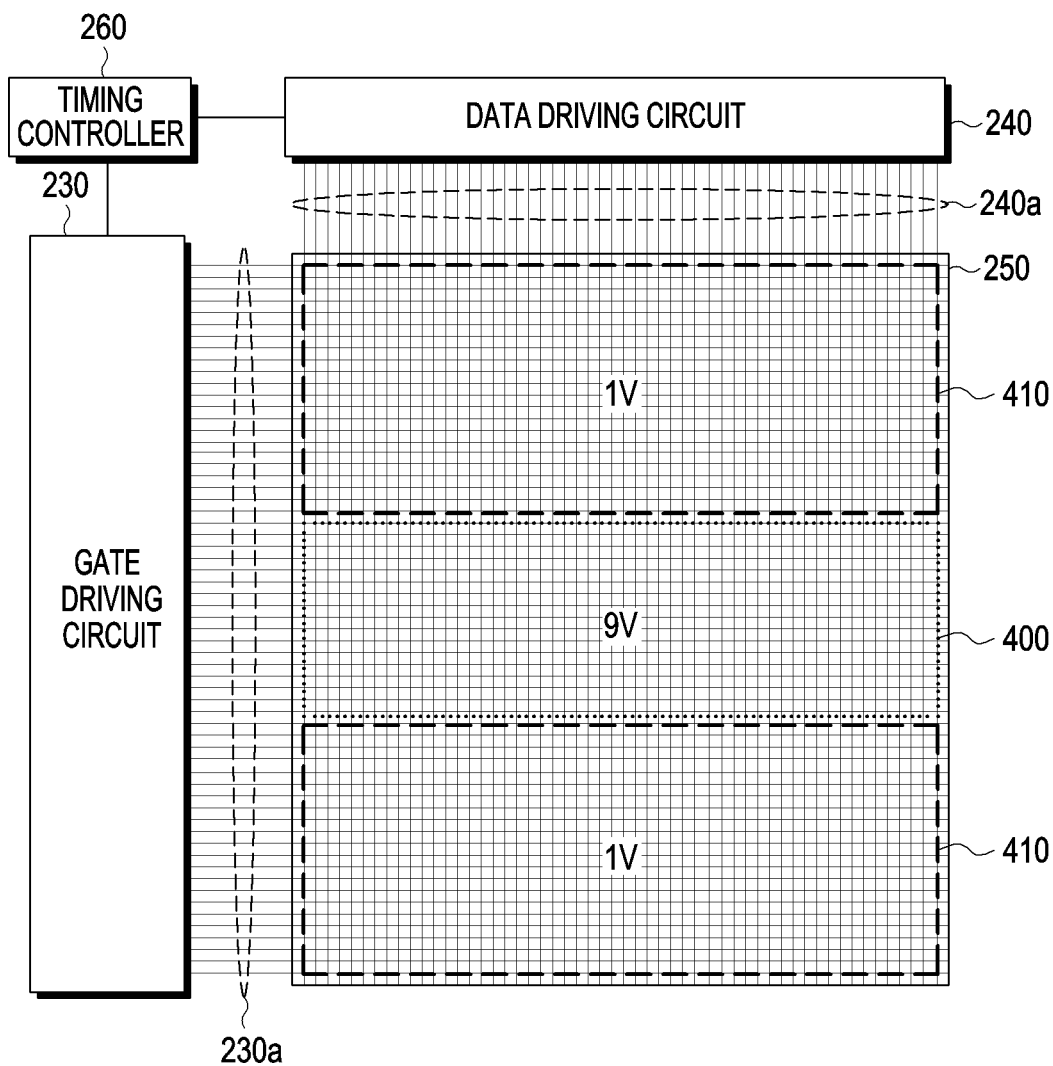

FIGS. 16A and 16B are views illustrating an implementation example for the operation of providing different voltages to a fingerprint sensing area 400 and a touch sensing area 410 according to various embodiments.

According to various embodiments of the disclosure, in the partial sensing mode, the fingerprint sensing area (e.g., the fingerprint sensing area 400 of FIG. 4B) may be used as an area for fingerprint registration, and the other area than the fingerprint sensing area may be distinguished from the fingerprint sensing area and be provided to the user for fingerprint authentication. According to various embodiments, the fingerprint sensing area provided for fingerprint authentication may be provided to the user, including (e.g., the entire display device (the display device 160 of FIG. 1)) the fingerprint sensing area, as well as the other area than the fingerprint sensing area. According to various embodiments, in the case of a designated application (e.g., an application requiring a high security level), fingerprint registration and authentication may be performed in the fingerprint sensing area (e.g., the fingerprint sensing area 400 of FIG. 4B).

Referring to FIG. 16A, according to various embodiments, the electronic device (e.g., the processor 120 of FIG. 1) may control the read-out circuit 220 to apply a relatively lower voltage (e.g., 3V), than that for the Tx electrodes corresponding to the touch sensing area 410, to the Tx electrodes corresponding to the fingerprint sensing area 400 according to various embodiments. Unlike that shown in FIG. 16A, according to various embodiments, the electronic device (e.g., the processor 120 of FIG. 1) may control the read-out circuit 220 to apply a relatively higher voltage, than that for the Tx electrodes corresponding to the touch sensing area 410, to the Tx electrodes corresponding to the fingerprint sensing area 400 according to various embodiments. As such, according to various embodiments, the electronic device (e.g., the processor 120 of FIG. 1) may control the read-out circuit 220 so that different voltages are provided to the Tx electrodes individually corresponding to the areas (e.g., the fingerprint sensing area 400 and the touch sensing area 410), generating an electric field barrier effect. According to various embodiments, as the electric field barrier effect is generated, the interference, with the fingerprint sensing area 400, of the ambient electric field may be reduced, so that a clear fingerprint image may be obtained, and the fingerprint recognition success rate may be increased. However, even when the touch sensor and the fingerprint sensor are included, as separate panels (or modules), in the electronic device (e.g., the electronic device 101 of FIG. 1), unlike in the embodiments described herein, the electronic device (e.g., the processor 120 of FIG. 1), according to various embodiments, may control the read-out circuit 220 to provide different voltages to the panels, thereby generating an electric field barrier effect according to various embodiments of the disclosure.

Referring to FIG. 16B, according to various embodiments, the electronic device (e.g., the processor 120 of FIG. 1) may apply different voltages to the display panel 250. For example, according to various embodiments, the electronic device (e.g., the processor 120 of FIG. 1) may control the gate driving circuit 230 to provide a relatively higher voltage (e.g., 9V), than that for the gate electrodes corresponding to the touch sensing area 410, to the gate electrodes corresponding to the fingerprint sensing area 400. Or, unlike that shown in FIG. 16B, according to various embodiments, the electronic device (e.g., the processor 120 of FIG. 1) may control the gate driving circuit 230 to apply a relatively lower voltage (e.g., 1V), than that for the gate electrodes corresponding to the touch sensing area 410, to the gate electrodes corresponding to the fingerprint sensing area 400. By such operation, an electric field barrier effect may be generated according to various embodiments.

Figure 17:
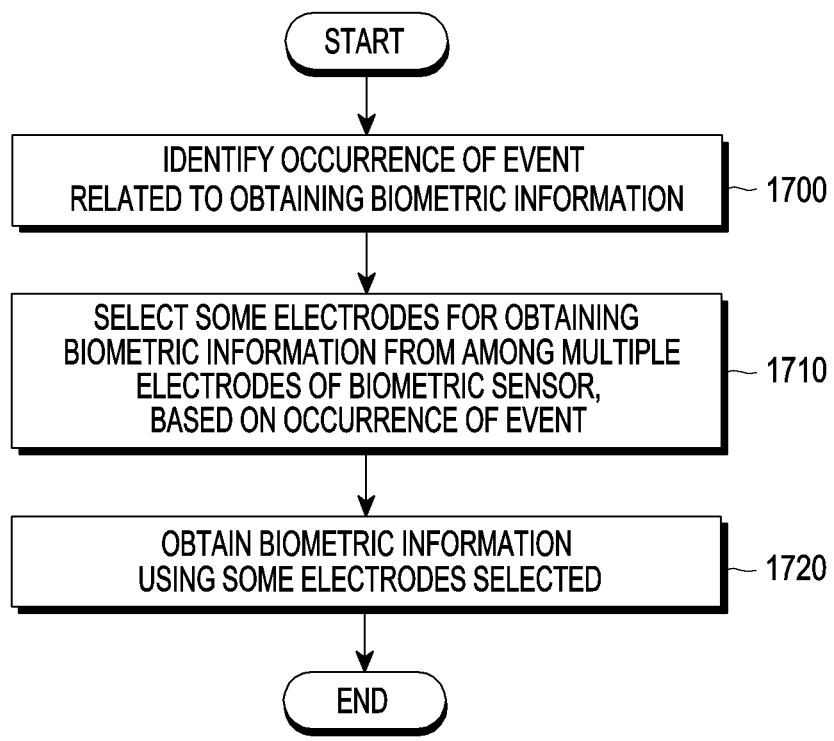
FIG. 17 is a view illustrating an example method of operating an electronic device according to various embodiments.

FIG. 17 is a view illustrating an example method of operating an electronic device according to various embodiments.

Referring to FIG. 17, according to various embodiments of the disclosure, the electronic device (e.g., the processor 120 of FIG. 1) may identify an occurrence of an event related to obtaining biometric information in operation 1700.

According to various embodiments of the disclosure, the electronic device (e.g., the processor 120 of FIG. 1) may select some electrodes for obtaining biometric information from among a plurality of electrodes based on the occurrence of the event in operation 1710.

According to various embodiments of the disclosure, the electronic device (e.g., the processor 120 of FIG. 1) may obtain biometric information using some electrodes selected, in operation 1720.

According to various embodiments, an electronic device (e.g., the electronic device 101 of FIG. 1) may comprise a biometric sensor (e.g., the fingerprint sensor 200 of FIG. 2A) including a plurality of electrodes (e.g., the Tx electrodes 222a and Rx electrodes 224a of FIG. 2A) for obtaining biometric information (e.g., the fingerprint image 330 of FIG. 3C) and a processor (e.g., the processor 120 of FIG. 1) electrically connected with the biometric sensor. The processor may be configured to identify an occurrence of an event related to obtaining the biometric information, select some electrodes for obtaining the biometric information from among the plurality of electrodes according to the occurrence of the event, and obtain the biometric information using the selected some electrodes.

According to various embodiments, the processor may be configured to output, to the biometric sensor, a control signal for selecting a designated number of electrodes, which are based on an order of proximity to a read-out circuit (e.g., the read-out circuit 220 of FIG. 2A) of the biometric sensor, as the some electrodes.

According to various embodiments, the processor may be configured to output a scanning signal for detecting noise information of the biometric sensor to a read-out circuit of the biometric sensor and select electrodes corresponding to an area, in which noise of the biometric sensor is lower than a designated range (e.g., a threshold), as the some electrodes based on the detected noise information.

According to various embodiments, the processor may be configured to output a scanning signal for detecting dynamic range information of the biometric sensor to a read-out circuit of the biometric sensor and select electrodes corresponding to an area, in which the dynamic range is larger than a designated range (e.g., a threshold), as the some electrodes based on the detected dynamic range information.

According to various embodiments, the processor may be configured to select a plurality of electrodes connected with one multiplexer (MUX) (e.g., the first multiplexer 240a of FIG. 4D) as some electrodes for obtaining the biometric information.

According to various embodiments, the biometric information may include fingerprint information. The event related to obtaining the biometric information may include at least one of a fingerprint registration event for storing information about a user's fingerprint in the electronic device, a fingerprint authentication event for authenticating the user, and an event of a long touch on the biometric sensor by the user's finger.

According to various embodiments, the processor may be configured to output, to the biometric sensor, a control signal for performing an operation for the biometric sensor to obtain the biometric information based on some electrodes for obtaining the biometric information.

According to various embodiments, the processor may be configured to provide a user with information about an area corresponding to the some selected electrodes using the electronic device.

According to various embodiments, the processor may be configured to display one or more objects (e.g., the application execution screen 610 of FIG. 6A) in an area other than an area of a display (e.g., the display device 160 of FIG. 1) corresponding to some electrodes for obtaining the biometric information.

According to various embodiments, the processor may be configured to output a control signal for controlling the biometric sensor to apply a first voltage (e.g., 3V of FIG. 16A) to the some electrodes and output a control signal for controlling the biometric sensor to apply a second voltage (e.g., 12V of FIG. 16A), which has a different value from the first voltage, to the other electrodes than the some electrodes among the plurality of electrodes.

According to various embodiments, a method for controlling an electronic device including a biometric sensor may comprise identifying, by the electronic device, an occurrence of an event related to obtaining the biometric information, selecting, by the electronic device, some electrodes for obtaining the biometric information from among a plurality of electrodes of the biometric sensor according to the occurrence of the event, and obtaining the biometric information using the selected some electrodes by the electronic device.

According to various embodiments, selecting the some electrodes may include selecting a designated number of electrodes, which are based on an order of proximity to a read-out circuit of the biometric sensor, as the some electrodes.

According to various embodiments, selecting the some electrodes may include performing scanning for detecting noise information of the biometric sensor and selecting electrodes corresponding to an area, in which noise of the biometric sensor is lower than a designated range, as the some electrodes based on a result of the scanning.

According to various embodiments, selecting the some electrodes may include performing scanning for detecting dynamic range information of the biometric sensor and selecting electrodes corresponding to an area, in which the dynamic range is larger than a designated range, as the some electrodes based on a result of the scanning.

According to various embodiments, the biometric information may include fingerprint information. The event related to obtaining the biometric information may include at least one of a fingerprint registration event for storing information about a user's fingerprint in the electronic device, a fingerprint authentication event for authenticating the user, and an event of a long touch on the biometric sensor by the user's finger.

According to various embodiments, the method may further comprise outputting, to the biometric sensor, a control signal for performing an operation for the biometric sensor to obtain the biometric information based on some electrodes for obtaining the biometric information.

According to various embodiments, the method may further comprise providing a user with information about an area corresponding to the some selected electrodes using the electronic device.

According to various embodiments, the method may further comprise displaying one or more objects in an area other than a display area corresponding to some electrodes for obtaining the biometric information.

According to various embodiments, the method may further comprise applying a first voltage to the some electrodes and applying a second voltage, which has a different value from the first voltage, to the other electrodes than the some electrodes among the plurality of electrodes.

According to various embodiments, a biometric sensor may comprise a touch panel (e.g., the touch panel 210 of FIG. 2A) with a plurality of electrodes and a read-out circuit connected with the plurality of electrodes. The read-out circuit may be configured to select some electrodes for obtaining biometric information from among the plurality of electrodes according to a control signal transmitted from a processor, outputting a driving signal for obtaining the biometric information only for the some selected electrodes, obtaining data for a variation in capacitance corresponding to the output of the driving signal, and transmitting the obtained data to the processor.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a biometric sensor including a plurality of electrodes for obtaining biometric information; and
   a processor electrically connected with the biometric sensor, wherein
   the processor is configured to:
     identify an occurrence of an event related to obtaining the biometric information,
     select some electrodes for obtaining the biometric information from among the plurality of electrodes according to the occurrence of the event, and
     obtain the biometric information using the selected some electrodes,
   wherein the processor is further configured to output, to the biometric sensor, a control signal for selecting a designated number of electrodes, which are based on an order of proximity to a read-out circuit of the biometric sensor, as the some electrodes.

2. The electronic device of claim 1, wherein the processor is configured to output a scanning signal for detecting noise information of the biometric sensor to a read-out circuit of the biometric sensor and select electrodes corresponding to an area, in which noise of the biometric sensor is lower than a designated range, as the some electrodes based on the detected noise information.

3. The electronic device of claim 1, wherein the processor is configured to output a scanning signal for detecting dynamic range information of the biometric sensor to a read-out circuit of the biometric sensor and select electrodes corresponding to an area, in which the dynamic range is larger than a designated range, as the some electrodes based on the detected dynamic range information.

4. The electronic device of claim 1, wherein the processor is configured to select a plurality of electrodes connected with one multiplexer (MUX) as some electrodes for obtaining the biometric information.

5. The electronic device of claim 1, wherein the biometric information includes fingerprint information, and wherein
the event related to obtaining the biometric information includes at least one of a fingerprint registration event for storing information about a user's fingerprint in the electronic device, a fingerprint authentication event for authenticating the user, and an event of a long touch on the biometric sensor by the user's finger.

6. The electronic device of claim 1, wherein the processor is configured to output, to the biometric sensor, a control signal for performing an operation for the biometric sensor to obtain the biometric information based on some electrodes for obtaining the biometric information.

7. The electronic device of claim 1, wherein the processor is configured to provide a user with information about an area corresponding to the some selected electrodes using the electronic device.

8. The electronic device of claim 1, wherein the processor is configured to display one or more objects in an area other than a display area corresponding to some electrodes for obtaining the biometric information.

9. The electronic device of claim 1, wherein
the processor is configured to output a control signal for controlling the biometric sensor to apply a first voltage to the some electrodes and output a control signal for controlling the biometric sensor to apply a second voltage, which has a different value from the first voltage, to the other electrodes than the some electrodes among the plurality of electrodes.

10. A method for controlling an electronic device including a biometric sensor, the method comprising:
identifying, by the electronic device, an occurrence of an event related to obtaining biometric information;
selecting, by the electronic device, some electrodes for obtaining the biometric information from among a plurality of electrodes of the biometric sensor according to the occurrence of the event; and
obtaining the biometric information using the selected some electrodes by the electronic device,
wherein selecting the some electrodes includes selecting a designated number of electrodes, which are based on an order of proximity to a read-out circuit of the biometric sensor, as the some electrodes.

11. The method of claim 10, wherein selecting the some electrodes includes:
performing scanning for detecting noise information of the biometric sensor; and
selecting electrodes corresponding to an area, in which noise of the biometric sensor is lower than a designated range, as the some electrodes based on a result of the scanning.

12. The method of claim 10, wherein selecting the some electrodes includes:
performing scanning for detecting dynamic range information of the biometric sensor; and
selecting electrodes corresponding to an area, in which the dynamic range is larger than a designated range, as the some electrodes based on a result of the scanning.

13. The method of claim 10, wherein the biometric information includes fingerprint information, and wherein
the event related to obtaining the biometric information includes at least one of a fingerprint registration event for storing information about a user's fingerprint in the electronic device, a fingerprint authentication event for authenticating the user, and an event of a long touch on the biometric sensor by the user's finger.

* * * * *